US012456151B1

(12) United States Patent
McNair

(10) Patent No.: US 12,456,151 B1
(45) Date of Patent: Oct. 28, 2025

(54) COMPUTER-BASED MEASUREMENT OF PRODUCTION EVENTS USING AUTOMATED TIMERS ACROSS MULTIPLE CLIENT-SERVER SYSTEMS

(71) Applicant: CERNER INNOVATION, INC., Kansas City, KS (US)

(72) Inventor: Douglas S. McNair, Seattle, WA (US)

(73) Assignee: Cerner Innovation, Inc., Kansas City, MO (US)

(*) Notice: Subject to any disclaimer, the term of this patent is extended or adjusted under 35 U.S.C. 154(b) by 64 days.

(21) Appl. No.: 17/542,089

(22) Filed: Dec. 3, 2021

Related U.S. Application Data

(63) Continuation of application No. 14/605,668, filed on Jan. 26, 2015, now abandoned.

(60) Provisional application No. 61/930,949, filed on Jan. 24, 2014.

(51) Int. Cl.
*G06F 40/30* (2020.01)
*G06Q 10/067* (2023.01)
*G06Q 40/12* (2023.01)

(52) U.S. Cl.
CPC ........... *G06Q 40/12* (2013.12); *G06Q 10/067* (2013.01)

(58) Field of Classification Search
CPC .............................. G06Q 40/12; G06Q 10/067
See application file for complete search history.

(56) References Cited

U.S. PATENT DOCUMENTS

| | | | |
|---|---|---|---|
| 2004/0034584 | A1 | 2/2004 | Cory et al. |
| 2007/0168696 | A1* | 7/2007 | Ridel ...................... H04L 43/00 714/E11.202 |
| 2009/0125448 | A1 | 5/2009 | Borkovec et al. |
| 2012/0243745 | A1* | 9/2012 | Amintafreshi ...... G06F 11/3692 382/103 |
| 2018/0097910 | A1* | 4/2018 | D'Agostino ............ H04L 67/60 |
| 2023/0036694 | A1* | 2/2023 | Coughlan ............. H04L 9/0861 |

* cited by examiner

*Primary Examiner* — Reginald R Reyes
(74) *Attorney, Agent, or Firm* — Kilpatrick Townsend & Stockton LLP

(57) ABSTRACT

The activities performed by an organization are conventionally identified using activity analysis. This involves determining what activities are done within the department, how many people and of which skills perform the activities, how much time they spend performing the activities, what resources are required to perform the activities, what operational data best reflect the performance of the activities, and the value of the activities to the organization. Historically, these determinations involved extensive interviewing and time-and-motion data gathering. However, some embodiments provided herein facilitate using an automated response time measurement system for measuring and characterizing activities for presentation on a user interface using online data that accrue as a byproduct of the performance of the activities.

15 Claims, 26 Drawing Sheets

Table 1: Cohort, Total hip arthroplasty admissions

| ITEM | VALUE |
| --- | --- |
| PATIENTS | 23,274 |
| SURGEONS | 496 |
| COSTS | $9,006 - $198,996 |

| Time (min) | Charge ($) | Grouping |
|---|---|---|
| 3 | 35118 | 5 |
| 3 | 35706 | 5 |
| 3 | 36562 | 5 |
| 3 | 39446 | 5 |
| 3 | 39683 | 5 |
| 3 | 40280 | 5 |
| 3 | 40833 | 5 |
| 3 | 40943 | 5 |
| 3 | 41418 | 5 |
| 3 | 44053 | 5 |
| 3 | 44749 | 5 |
| 3 | 45608 | 5 |
| 3 | 47794 | 5 |
| 3 | 49230 | 5 |
| 3 | 51322 | 5 |
| 3 | 51448 | 5 |
| 4 | 36074 | 5 |
| 4 | 38162 | 5 |
| 4 | 39364 | 5 |
| 4 | 48224 | 5 |
| 4 | 49446 | 5 |
| 5 | 37951 | 5 |
| 5 | 42404 | 5 |
| 5 | 48504 | 5 |
| 7 | 61102 | 5 |
| 3 | 41174 | 5 |
| 3 | 44119 | 5 |
| 3 | 45254 | 5 |
| 3 | 48219 | 5 |
| 3 | 48373 | 5 |
| 3 | 53643 | 5 |

*FIG. 3C.*

Table 2: Cohort, Essential hypertension admissions

| ITEM | VALUE |
|---|---|
| PATIENTS | 432,604 |
| SURGEONS | 858 |
| COSTS | $3,000 - $199,983 |

Hypertension – Time, Charge, Grouping

| t | chg | grp | race |
|---|---|---|---|
| 7 | 37136 | 10 | 1 |
| 2 | 5739 | 10 | 1 |
| 2 | 29104 | 10 | 4 |
| 4 | 23805 | 10 | 4 |
| 2 | 25333 | 10 | 1 |
| 3 | 63902 | 3 | 1 |
| 4 | 11800 | 10 | 1 |
| 7 | 27440 | 10 | 1 |
| 4 | 12443 | 10 | 5 |
| 2 | 9225 | 10 | 1 |
| 10 | 101857 | 10 | 1 |
| 23 | 27322 | 6 | 1 |
| 4 | 25929 | 10 | 1 |
| 3 | 11323 | 10 | 1 |
| 1 | 9201 | 10 | 1 |
| 5 | 58086 | 10 | 1 |
| 4 | 10419 | 10 | 1 |
| 3 | 22931 | 10 | 1 |
| 7 | 17463 | 10 | 1 |
| 5 | 23256 | 10 | 1 |
| 9 | 28917 | 10 | 4 |
| 8 | 27619 | 10 | 1 |
| 9 | 68129 | 10 | 5 |
| 4 | 12898 | 10 | 1 |
| 3 | 72245 | 3 | 1 |
| 6 | 41812 | 10 | 1 |
| 3 | 13967 | 10 | 1 |
| 5 | 20550 | 10 | 1 |
| 5 | 49634 | 10 | 1 |
| 4 | 26878 | 10 | 1 |
| 4 | 11323 | 10 | 1 |

*FIG. 4C.*

Table 3: Cohort, Type 2 diabetes

| ITEM | VALUE |
|---|---|
| PATIENTS | 220,468 |
| SURGEONS | 1,267 |
| COSTS | $4,376 - $71,119 |

Type 2 Diabetes — Time, Charge, Grouping

| t | chg | grp |
|---|---|---|
| 7 | 11277 | 0 |
| 3 | 10992 | 1 |
| 5 | 11072 | 2 |
| 27 | 15678 | 3 |
| 16 | 12115 | 0 |
| 5 | 13500 | 1 |
| 5 | 11341 | 2 |
| 9 | 10758 | 3 |
| 15 | 12042 | 0 |
| 7 | 11322 | 1 |
| 9 | 12433 | 2 |
| 29 | 14487 | 3 |
| 5 | 10978 | 0 |
| 17 | 13592 | 1 |
| 18 | 12142 | 2 |
| 44 | 19930 | 3 |
| 9 | 11198 | 0 |
| 6 | 13003 | 1 |
| 8 | 12631 | 2 |
| 4 | 10884 | 3 |
| 14 | 11989 | 0 |
| 10 | 11396 | 1 |
| 8 | 11660 | 2 |
| 5 | 11107 | 3 |
| 11 | 11481 | 0 |
| 10 | 12023 | 1 |
| 9 | 12006 | 2 |
| 4 | 11025 | 3 |
| 25 | 20246 | 0 |
| 11 | 11415 | 1 |
| 32 | 12637 | 2 |

```
library(profdpm)
set.seed(1237)

docs <- as.matrix(read.csv(file="c:/0_cerdsm/IP/TDABC/dsm_tha_docs.csv"))
length(docs[,1])
hist(docs[,2])
hist(log(docs[,2]))

quantile(docs[,2],0.1) # 3.7 cases per year avg
quantile(docs[,2],0.2) # 5.6
quantile(docs[,2],0.3) # 7.1
quantile(docs[,2],0.4) # 8.9
quantile(docs[,2],0.5) # 11.8
quantile(docs[,2],0.6) # 15.2
quantile(docs[,2],0.7) # 19.1
quantile(docs[,2],0.8) # 30.2
quantile(docs[,2],0.9) # 49.9 quantile(docs[,2],0.2) # 3.7 cases per year avg
quantile(docs[,2],0.4) # 5.6
quantile(docs[,2],0.6) # 7.1
quantile(docs[,2],0.8) # 8.9 deciles
cases <- as.matrix(read.csv(file="c:/0_cerdsm/IP/TDABC/dsm_tha_t_chg_grp.csv"))
min(cases[,2])
max(cases[,2])
length(cases[,2])
dat <- data.frame(cases)
system.time(fitl <- profLinear(chg ~ t, data=dat, maxiter=10000, group=grp, crit=1e-6,
method="stochastic", sampler=FALSE))

summary(fitl)

# plot the resulting fit(s)
plot(dat$t, dat$chg, xlab='cum_HNAM_session_time', ylab='CHG')
for(i in 1:length(fitl$m)) {
 abline( a=fitl$m[[i]][1], b=fitl$m[[i]][2] )
}
```

600

.
.
.

FIG. 6A   CONTINUES IN FIG. 6B

CONTINUES FROM FIG. 6A

FIG. 6B

```
----------
cluster: 1
# groups: 3
# obs:    2763
#           estimate  lower95  upper95
# (intercept) 32871.987 32086.633 33657.341
# t       2769.668  2585.086  2954.250
# ----------
cluster: 2
groups: 2
# obs:    2540
#           estimate  lower95  upper95
# (intercept) 25040.268 24269.479 25811.056
# t       4575.789  4399.636  4751.942
# ----------
cluster: 3
groups: 2
# obs:    9302
#           estimate  lower95  upper95
# (intercept) 32342.792 31948.407 32737.176
# t       2300.081  2196.835  2403.327
# ----------
cluster: 4
# groups: 2
# obs:    4887
          estimate  lower95  upper95
# (intercept) 27350.266 26861.283 27839.249
# t       3799.695  3680.175  3919.215
# ----------
cluster: 5
groups: 1
# obs:    3782
#           estimate  lower95  upper95
# (intercept) 32829.739 32298.891 33360.587
# t       3411.131  3270.316  3551.946
---------- grps in clust   rank_slope  rank_intercept
subset(fitl$group, subset=(fitl$clust==1)) # 0, 3, 4      2770-4     32872-1
subset(fitl$group, subset=(fitl$clust==2)) # 1, 5         4576-1     25040-5
subset(fitl$group, subset=(fitl$clust==3)) # 2, 9         2300-5     32342-3
subset(fitl$group, subset=(fitl$clust==4)) # 6, 7         3800-2     27350-4
subset(fitl$group, subset=(fitl$clust==5)) # 8            3411-3     32830-2 quintiles log model
cases <- as.matrix(read.csv(file="c:/0_cerdsm/IP/TDABC/dsm_tha_t_chg_grp2.csv"))
dat <- data.frame(cases)
system.time(fitl <- profLinear(log(chg) ~ log(t + 0.5), data=dat, maxiter=10000, group=grp, crit=1e-6,
  method="stochastic", sampler=FALSE))

summary(fitl)

# plot the resulting fit(s)
plot(log(dat$t + 0.5), log(dat$chg), xlab='log(cum_HNAM_session_time)', ylab='log(CHG)')
for(i in 1:length(fitl$m)) {
  abline( a=fitl$m[[i]][1], b=fitl$m[[i]][2] )
}
```

600

CONTINUES FROM FIG. 6B

*FIG. 6C*

```
----------
cluster: 1
# groups: 2
# obs:   6046
#             estimate lower95 upper95
# (intercept)    10.042  10.032  10.053
# log(t + 0.5)    0.364   0.357   0.372
# ----------
cluster: 2
groups: 1
# obs:   2018
#             estimate lower95 upper95
# (intercept)   10.4613 10.4411 10.4816
# log(t + 0.5)   0.0764  0.0622  0.0907
# ----------
cluster: 3
groups: 1
# obs:   3057
#             estimate lower95 upper95
# (intercept)    10.062  10.045  10.078
# log(t + 0.5)    0.330   0.318   0.341
# ----------
cluster: 4
groups: 1
# obs:   12153
#             estimate lower95 upper95
# (intercept)    10.289  10.282  10.297
# log(t + 0.5)    0.186   0.180   0.192
# ----------
```

600

```
#                                grps in clust   rank_slope  rank_intercept
subset(fitl$group, subset=(fitl$clust==1)) # 0, 3     0.364-1    10.04-4
subset(fitl$group, subset=(fitl$clust==2)) # 1        0.076-4    10.46-1
subset(fitl$group, subset=(fitl$clust==3)) # 2        0.330-2    10.06-3
subset(fitl$group, subset=(fitl$clust==4)) # 4        0.186-3    10.29-2
``` highest volume operators take on more difficult/complex cases but have costs that are relatively time insensitive
infrequent operators take on less difficult/complex cases but have costs that are time sensitive

```
# quintiles log model - gibbs
cases <- as.matrix(read.csv(file="c:/0_cerdsm/IP/TDABC/dsm_tha_t_chg_grp2.csv"))
dat <- data.frame(cases)
system.time(fitl <- profLinear(log(chg) ~ log(t + 0.5), data=dat, maxiter=10000, group=grp, crit=1e-6,
method="gibbs", sampler=FALSE))

summary(fitl)

# plot the resulting fit(s)
plot(log(dat$t + 0.5), log(dat$chg), xlab='log(cum_HNAM_session_time)', ylab='log(CHG)')
for(i in 1:length(fitl$m)) {
  abline( a=fitl$m[[i]][1], b=fitl$m[[i]][2] )
} quintiles log model - agglomerative
cases <- as.matrix(read.csv(file="c:/0_cerdsm/IP/TDABC/dsm_tha_t_chg_grp2.csv"))
dat <- data.frame(cases)
system.time(fitl <- profLinear(log(chg) ~ log(t + 0.5), data=dat, maxiter=10000, group=grp, crit=1e-6,
method="agglomerative", sampler=FALSE))
```

FIG. 6D

CONTINUES FROM FIG. 6C

.
.
.

600

```
summary(fitl)

# plot the resulting fit(s)
plot(log(dat$t + 0.5), log(dat$chg), xlab='log(cum_HNAM_session_time)', ylab='log(CHG)')
for(i in 1:length(fitl$m)) {
  abline( a=fitl$m[[i]][1], b=fitl$m[[i]][2] )
} quintiles lin model
cases <- as.matrix(read.csv(file="c:/0_cerdsm/IP/TDABC/dsm_tha_t_chg_grp2.csv"))
dat <- data.frame(cases)
system.time(fitl <- profLinear(chg ~ t, data=dat, maxiter=10000, group=grp, crit=1e-6,
method="stochastic", sampler=FALSE))

summary(fitl)

# plot the resulting fit(s)
plot(dat$t, dat$chg, xlab='cum_HNAM_session_time', ylab='CHG')
for(i in 1:length(fitl$m)) {
  abline( a=fitl$m[[i]][1], b=fitl$m[[i]][2] )
} quintiles lin model - gibbs
cases <- as.matrix(read.csv(file="c:/0_cerdsm/IP/TDABC/dsm_tha_t_chg_grp2.csv"))
dat <- data.frame(cases)
system.time(fitl <- profLinear(chg ~ t, data=dat, maxiter=10000, group=grp, crit=1e-6, method="gibbs",
sampler=FALSE))

summary(fitl)

# plot the resulting fit(s)
plot(dat$t, dat$chg, xlab='cum_HNAM_session_time', ylab='CHG')
for(i in 1:length(fitl$m)) {
  abline( a=fitl$m[[i]][1], b=fitl$m[[i]][2] )
} quintiles lin model - agglomerative
cases <- as.matrix(read.csv(file="c:/0_cerdsm/IP/TDABC/dsm_tha_t_chg_grp2.csv"))
dat <- data.frame(cases)
system.time(fitl <- profLinear(chg ~ t, data=dat, maxiter=10000, group=grp, crit=1e-6,
method="agglomerative", sampler=FALSE))

summary(fitl)

# plot the resulting fit(s)
plot(dat$t, dat$chg, xlab='cum_HNAM_session_time', ylab='CHG')
for(i in 1:length(fitl$m)) {
  abline( a=fitl$m[[i]][1], b=fitl$m[[i]][2] )
}
```

```
library(profdpm)
set.seed(1237)

docs <- as.matrix(read.csv(file="c:/0_cerdsm/IP/TDABC/dsm_htn_docs.csv"))
hist(docs[,2])
hist(log(docs[,2]))

quantile(docs[,2],0.1) # 1.4  cases per year avg
quantile(docs[,2],0.2) # 1.9
quantile(docs[,2],0.3) # 2.4
quantile(docs[,2],0.4) # 2.8
quantile(docs[,2],0.5) # 3.3
quantile(docs[,2],0.6) # 4.0
quantile(docs[,2],0.7) # 5.0
quantile(docs[,2],0.8) # 6.5
quantile(docs[,2],0.9) # 9.8 quantile(docs[,2],0.2) # 1.9  cases per year avg
quantile(docs[,2],0.4) # 2.8
quantile(docs[,2],0.6) # 4.0
quantile(docs[,2],0.8) # 6.5 min(docs[,2]) #  0.6
max(docs[,2]) # 194.7 cases per year avg deciles of ann case volume
cases <- as.matrix(read.csv(file="c:/0_cerdsm/IP/TDABC/dsm_htn_t_chg_grp.csv"))
min(cases[,2])
max(cases[,2])
length(cases[,2])
dat <- data.frame(cases)
system.time(fitl <- profLinear(chg ~ t, data=dat, maxiter=10000, group=grp, crit=1e-10,
method="stochastic", sampler=FALSE))

summary(fitl)

# plot the resulting fit(s)
plot(dat$t, dat$chg, xlab='cum_HNAM_session_time', ylab='CHG')
for(i in 1:length(fitl$m)) {
 abline( a=fitl$m[[i]][1], b=fitl$m[[i]][2] )
}
```

700

⋮

FIG. 7A    CONTINUES IN FIG. 7B

FIG. 7B

CONTINUES FROM FIG. 7A

.
.
.

```
----------
cluster: 1
groups: 1
# obs:    15919
#         estimate  lower95  upper95
# (intercept) 11168.928 10910.065 11427.791
# t       2739.081  2693.784  2784.377
# ----------
cluster: 2
groups: 1
# obs:    23983
#         estimate  lower95  upper95
# (intercept) 19117.031 18852.785 19381.277
# t       699.063  670.076  728.050
# ----------
cluster: 3
groups: 1
# obs:    26958
#         estimate  lower95  upper95
# (intercept) 23679.354 23400.252 23958.457
# t       213.357  194.105  232.609
# ----------
cluster: 4
groups: 1
# obs:    24295
#         estimate  lower95  upper95
# (intercept) 24027.266 23744.022 24310.511
# t       985.962  955.830  1016.095
# ----------
cluster: 5
groups: 1
# obs:    27989
#         estimate  lower95  upper95
# (intercept) 12510.073 12263.780 12756.366
# t       3314.627  3274.101  3355.154
# ----------
# cluster: 6
groups: 1
# obs:    32117
#         estimate  lower95  upper95
# (intercept) 16863.209 16618.715 17107.703
# t       2365.796  2325.938  2405.654
```

```
----------
# cluster: 7
groups: 1
# obs:    36214
#         estimate  lower95  upper95
# (intercept) 10078.211 9890.666 10265.755
# t       2960.235 2929.330  2991.140
# ----------
# cluster: 8
groups: 1
# obs:    35412
#         estimate  lower95  upper95
# (intercept) 13594.720 13387.802 13801.638
# t       2399.156 2367.044 2431.267
# ----------
# cluster: 9
groups: 1
# obs:    40873
#         estimate  lower95  upper95
# (intercept) 8825.489 8650.346 9000.632
# t       3782.261 3751.975 3812.546
# ----------
# cluster: 10
# groups: 1
# obs:    168844
#         estimate  lower95  upper95
# (intercept) 7791.090 7696.122 7886.057
# t       3869.360 3853.359 3885.361
# ----------
```

.
.
.

CONTINUES IN FIG. 7C

CONTINUES FROM FIG. 7B  FIG. 7C

⋮

700

```
grps in clust  rank_intercept  rank_slope
subset(fitl$group, subset=(fitl$clust==1)) # 0            7               5
subset(fitl$group, subset=(fitl$clust==2)) # 1            3               10
subset(fitl$group, subset=(fitl$clust==3)) # 2            2               9
subset(fitl$group, subset=(fitl$clust==4)) # 3            1               8
subset(fitl$group, subset=(fitl$clust==5)) # 4            6               3
subset(fitl$group, subset=(fitl$clust==6)) # 5            4               7
subset(fitl$group, subset=(fitl$clust==7)) # 6            8               4
subset(fitl$group, subset=(fitl$clust==8)) # 7            5               6
subset(fitl$group, subset=(fitl$clust==9)) # 8            9               2
subset(fitl$group, subset=(fitl$clust==10))# 9            10              1 highest volume hospitalists take on both simple complex cases and quickly and cheaply discharge, but
have costs that are time sensitive
# infrequent admitters take on less difficult/complex cases with high base costs but have costs that are
quite time insensitive deciles log model
cases <- as.matrix(read.csv(file="c:/0_cerdsm/IP/TDABC/dsm_htn_t_chg_grp.csv"))
dat <- data.frame(cases)
system.time(fitl <- profLinear(log(chg) ~ log(t + 0.5), data=dat, maxiter=10000, group=grp, crit=1e-10,
method="gibbs", sampler=FALSE))

summary(fitl)

# plot the resulting fit(s)
plot(log(dat$t + 0.5), log(dat$chg), xlab='log(cum_HNAM_session_time)', ylab='log(CHG)')
for(i in 1:length(fitl$m)) {
  abline( a=fitl$m[[i]][1], b=fitl$m[[i]][2] )
} recode deciles to quintiles
for (i in 1:length(dat$t)) {
  dat$grp[i] <- floor((dat$grp[i]+1)/2)
}
```

⋮

CONTINUES IN FIG. 7D

CONTINUES FROM FIG. 7C

.
.
.

deciles
---------
cluster: 1
groups: 1
obs:   15919
         estimate lower95 upper95
(intercept)     8.898  8.889  8.908
log(t + 0.5)    0.633  0.627  0.640
---------
cluster: 2
groups: 1
obs:   23983
         estimate lower95 upper95
(intercept)     8.919  8.910  8.928
log(t + 0.5)    0.537  0.532  0.543
---------
cluster: 3
groups: 2
obs:   62370
         estimate lower95 upper95
(intercept)     9.000  8.995  9.006
log(t + 0.5)    0.551  0.548  0.555
---------
cluster: 4
groups: 1
obs:   24295
         estimate lower95 upper95
(intercept)     9.253  9.244  9.262
log(t + 0.5)    0.496  0.491  0.502
---------
cluster: 5
groups: 1
obs:   27989
         estimate lower95 upper95
(intercept)     8.989  8.981  8.998
log(t + 0.5)    0.641  0.635  0.646

---------
cluster: 6
groups: 1
obs:   32117
         estimate lower95 upper95
(intercept)     9.166  9.158  9.174
log(t + 0.5)    0.527  0.521  0.532
---------
cluster: 7
groups: 1
obs:   36214
         estimate lower95 upper95
(intercept)     8.829  8.822  8.835
log(t + 0.5)    0.656  0.652  0.660
---------
cluster: 8
groups: 1
obs:   40873
         estimate lower95 upper95
(intercept)     8.708  8.702  8.714
log(t + 0.5)    0.805  0.800  0.809
---------
cluster: 9
groups: 1
obs:   168844
         estimate lower95 upper95
(intercept)     8.736  8.733  8.739
log(t + 0.5)    0.744  0.742  0.746
---------

.
.
.

CONTINUES IN FIG. 7E

CONTINUES FROM FIG. 7D

```
# quintiles log model
cases <- as.matrix(read.csv(file="c:/0_cerdsm/IP/TDABC/dsm_htn_t_chg_grp2.csv"))
dat <- data.frame(cases)
system.time(fitl <- profLinear(log(chg) ~ log(t + 0.5), data=dat, maxiter=10000, group=grp, crit=1e-10,
method="gibbs", sampler=FALSE))

summary(fitl)

# plot the resulting fit(s)
plot(log(dat$t + 0.5), log(dat$chg), xlab='log(cum_HNAM_session_time)', ylab='log(CHG)')
for(i in 1:length(fitl$m)) {
  abline( a=fitl$m[[i]][1], b=fitl$m[[i]][2] )
} recode deciles to quintiles
for (i in 1:length(dat$t)) {
  dat$grp[i] <- floor((dat$grp[i]+1)/2)
}
```

```
----------
cluster: 1
groups: 1
obs:   39902
            estimate lower95 upper95
(intercept)    8.917   8.910   8.923
log(t + 0.5)   0.570   0.566   0.575
----------
cluster: 2
groups: 1
obs:   51253
            estimate lower95 upper95
(intercept)    9.107   9.100   9.113
log(t + 0.5)   0.529   0.525   0.533
----------
cluster: 3
groups: 1
obs:   60106
            estimate lower95 upper95
(intercept)    9.082   9.077   9.088
log(t + 0.5)   0.581   0.578   0.585
----------
cluster: 4
groups: 1
obs:   71626
            estimate lower95 upper95
(intercept)    8.920   8.915   8.925
log(t + 0.5)   0.602   0.599   0.606
----------
cluster: 5
groups: 1
obs:   209717
            estimate lower95 upper95
(intercept)    8.731   8.728   8.734
log(t + 0.5)   0.755   0.753   0.757
----------
```

CONTINUES IN FIG. 7F

CONTINUES FROM FIG. 7E

```
grps in clust  rank_intercept  rank_slope
subset(fitl$group, subset=(fitl$clust==1)) # 0          3.5              4
subset(fitl$group, subset=(fitl$clust==2)) # 1          1                5
subset(fitl$group, subset=(fitl$clust==3)) # 2          2                3
subset(fitl$group, subset=(fitl$clust==4)) # 3          3.5              2
subset(fitl$group, subset=(fitl$clust==5)) # 4          5                1 quintiles lin model
cases <- as.matrix(read.csv(file="c:/0_cerdsm/IP/TDABC/dsm_htn_t_chg_grp2.csv"))
dat <- data.frame(cases)
system.time(fitl <- profLinear(chg ~ t, data=dat, maxiter=10000, group=grp, crit=1e-10, method="gibbs", sampler=FALSE))

summary(fitl)

# plot the resulting fit(s)
plot(dat$t, dat$chg, xlab='cum_HNAM_session_time', ylab='CHG')
for(i in 1:length(fitl$m)) {
  abline( a=fitl$m[[i]][1], b=fitl$m[[i]][2] )
}
```

```
----------
cluster: 1
groups: 1
obs:    39902
           estimate    lower95    upper95
(intercept) 18222.561  18028.167  18416.956
t           968.953    944.457    993.449
----------
cluster: 2
groups: 1
obs:    51253
           estimate    lower95    upper95
(intercept) 24833.588  24631.415  25035.762
t           393.757    377.382    410.133
----------
cluster: 3
groups: 1
obs:    60106
           estimate    lower95    upper95
(intercept) 15015.472  14840.925  15190.019
t           2776.749   2748.171   2805.327
----------
cluster: 4
groups: 1
obs:    71626
           estimate    lower95    upper95
(intercept) 11826.571  11686.776  11966.367
t           2671.551   2649.208   2693.894
----------
cluster: 5
groups: 1
obs:    209717
           estimate    lower95    upper95
(intercept) 8004.238   7920.497   8087.980
t           3850.509   3836.329   3864.688
----------
```

CONTINUES FROM FIG. 7F

```
# highest volume hospitalists take on both simple complex cases and quickly and cheaply discharge, but
have costs that are time sensitive
# infrequent admitters take on less difficult/complex cases with high base costs but have costs that are
quite time insensitive grps in clust  rank_intercept rank_slope
subset(fitl$group, subset=(fitl$clust==1)) # 0      2            4
subset(fitl$group, subset=(fitl$clust==2)) # 1      1            5
subset(fitl$group, subset=(fitl$clust==3)) # 2      3            2
subset(fitl$group, subset=(fitl$clust==4)) # 3      4            3
subset(fitl$group, subset=(fitl$clust==5)) # 4      5            1 race log model - gibbs
cases <- as.matrix(read.csv(file="c:/0_cerdsm/IP/TDABC/dsm_htn_t_chg_grp.csv"))
dat <- data.frame(cases)
system.time(fitl <- profLinear(log(chg) ~ log(t + 0.5), data=dat, maxiter=10000, group=race, crit=1e-6,
method="gibbs", sampler=FALSE))

summary(fitl)

# plot the resulting fit(s)
plot(log(dat$t + 0.5), log(dat$chg), xlab='log(cum_HNAM_session_time)', ylab='log(CHG)')
for(i in 1:length(fitl$m)) {
  abline( a=fitl$m[[i]][1], b=fitl$m[[i]][2] )
}

----------
cluster: 1
groups: 1
obs:   348841
        estimate lower95 upper95
(intercept)   8.887  8.885  8.889
log(t + 0.5)  0.648  0.646  0.649
----------
cluster: 2
groups: 2
obs:   8259
        estimate lower95 upper95
(intercept)   8.825  8.812  8.838
log(t + 0.5)  0.775  0.766  0.783
----------
cluster: 3
groups: 2
obs:   63221
        estimate lower95 upper95
(intercept)   8.838  8.833  8.844
log(t + 0.5)  0.682  0.678  0.685
----------
cluster: 4
groups: 1
obs:   12283
        estimate lower95 upper95
(intercept)   8.837  8.825  8.848
log(t + 0.5)  0.746  0.738  0.754
----------
```

CONTINUES IN FIG. 7H

CONTINUES FROM FIG. 7G

| # | grps in clust | rank_intercept | rank_slope |
|---|---|---|---|
| subset(fitl$group, subset=(fitl$clust==1)) | # 0 | 2 | 3 |
| subset(fitl$group, subset=(fitl$clust==2)) | # 1, 3 | 3 | 1 |
| subset(fitl$group, subset=(fitl$clust==3)) | # 2, 4 | 4 | 2 |
| subset(fitl$group, subset=(fitl$clust==4)) | # 5 | 1 | 4 |

A majority of Race-3 hypertensives have moderate base costs and incremental costs that are weakly time sensitive
A subset of Race-3, Race-4, Race-2, and Race-5 hypertensives have low base cost but incremental costs that are highly time sensitive
Race-1 hypertensives have high base costs but have costs that are quite time insensitive

```
# race log model - gibbs
cases <- as.matrix(read.csv(file="c:/0_cerdsm/IP/TDABC/dsm_htn_t_chg_grp.csv"))
dat <- data.frame(cases)
system.time(fitl <- profLinear(log(chg) ~ log(t + 0.5), data=dat, maxiter=10000, group=race, crit=1e-6,
method="gibbs", sampler=FALSE))

summary(fitl)

# plot the resulting fit(s)
plot(log(dat$t + 0.5), log(dat$chg), xlab='log(cum_HNAM_session_time)', ylab='log(CHG)')
for(i in 1:length(fitl$m)) {
  abline( a=fitl$m[[i]][1], b=fitl$m[[i]][2] )
} dxy <- as.matrix(cbind(dat$t, dat$chg), ncol=2)
contour(log(dat$t + 0.5), log(dat$chg), xlab='log(cum_HNAM_session_time)', ylab='log(CHG)')
for(i in 1:length(fitl$m)) {
  abline( a=fitl$m[[i]][1], b=fitl$m[[i]][2] )
}
library("KernSmooth")
data("CYGOB1", package="HSAUR")
CYGOB1d <- bkde2D(CYGOB1, bandwidth = sapply(CYGOB1, dpik))
contour(x=CYGOB1d$x1, y=CYGOB1d$x2, z=CYGOB1d$fhat)

# race lin model - gibbs
cases <- as.matrix(read.csv(file="c:/0_cerdsm/IP/TDABC/dsm_htn_t_chg_grp.csv"))
dat <- data.frame(cases)
system.time(fitl <- profLinear(chg ~ t, data=dat, maxiter=10000, group=race, crit=1e-6, method="gibbs",
sampler=FALSE))

summary(fitl)

# plot the resulting fit(s)
plot(dat$t, dat$chg, xlab='cum_HNAM_session_time', ylab='CHG')
for(i in 1:length(fitl$m)) {
  abline( a=fitl$m[[i]][1], b=fitl$m[[i]][2] )
}
```

CONTINUES FROM FIG. 7I

CONTINUES FROM FIG. 7H
.
.
.

----------
cluster: 1
groups: 1
obs: 348841
      estimate  lower95  upper95
(intercept) 15074.288 15004.564 15144.012
t     2208.806 2198.139 2219.473
----------
cluster: 2
groups: 2
obs: 8259
      estimate  lower95  upper95
(intercept) 11053.572 10645.845 11461.299
t     3518.026 3450.935 3585.118
----------
cluster: 3
groups: 2
obs: 63221
      estimate  lower95  upper95
(intercept) 10740.018 10575.958 10904.078
t     3162.711 3138.178 3187.244
----------
cluster: 4
groups: 1
obs: 12283
      estimate  lower95  upper95
(intercept) 25252.168 24816.385 25687.951
t     169.109 146.711 191.507
----------

\#                         grps in clust rank_intercept rank_slope
subset(fitI$group, subset=(fitI$clust==1)) # 0
subset(fitI$group, subset=(fitI$clust==2)) # 1, 3
subset(fitI$group, subset=(fitI$clust==3)) # 2, 4
subset(fitI$group, subset=(fitI$clust==4)) # 5

```
library(profdpm)
set.seed(1237)

docs <- as.matrix(read.csv(file="c:/0_cerdsm/IP/TDABC/dsm_dm_docs.csv"))
length(docs[,1])

# log model
cases <- as.matrix(read.csv(file="c:/0_cerdsm/IP/TDABC/dsm_dm_t_chg_grp.csv"))
min(cases[,2])
max(cases[,2])
length(cases[,2])
dat <- data.frame(cases)
system.time(fitl <- profLinear(log(chg) ~ log(t + 0.5), data=dat, maxiter=10000, group=grp, crit=1e-4,
method="agglomerative", sampler=FALSE))

summary(fitl)
----------
cluster: 1
groups: 1
obs:    220104
        estimate lower95 upper95
(intercept)  9.062   9.062   9.062
log(t + 0.5) 0.155   0.155   0.156
----------
cluster: 2
groups: 1
obs:    13508
        estimate lower95 upper95
(intercept)  9.6186  9.6182  9.6191
log(t + 0.5) -0.0761 -0.0762 -0.0759
----------
cluster: 3
groups: 1
obs:    6856
        estimate lower95 upper95
(intercept)  10.018  10.017  10.019
log(t + 0.5) -0.199  -0.199  -0.199
----------
```

800

⋮

FIG. 8A   CONTINUES IN FIG. 8B

CONTINUES FROM FIG. 8A

.
.
.

```
# plot the resulting fit(s)
plot(log(dat$t + 0.5), log(dat$chg), xlab='log(cum_HNAM_session_time)', ylab='log(CHG)')
for(i in 1:length(fitl$m)) {
  abline( a=fitl$m[[i]][1], b=fitl$m[[i]][2] )
}
```
                                                                              800 adherents' costs decrease with greater provider investment of time for optimizing regimen and coaching
some endocrinologist-patient pairs in cluster 3 spend larger and more frequent time optimizing regimen
and decrease cost even more
a majority of general internists and family practitioners managing diabetics do not spend very much
time per year managing the diabetes
nonadherents' are unreceptive to coaching due to comorbid depression or other factors and costs
increase, with more PACs consuming more provider time

```
# lin model
cases <- as.matrix(read.csv(file="c:/0_cerdsm/IP/TDABC/dsm_dm_t_chg_grp.csv"))
dat <- data.frame(cases)
system.time(fitl <- profLinear(chg ~ t, data=dat, maxiter=10000, group=grp, crit=1e-4,
method="agglomerative", sampler=FALSE))

summary(fitl)
----------
cluster: 1
groups: 1
obs:    220104
        estimate   lower95    upper95
(intercept) 10455.199 10446.949 10463.449
t        175.357   174.749   175.965
----------
cluster: 2
groups: 1
obs:    13508
        estimate   lower95    upper95
(intercept) 12707.516 12705.375 12709.657
t        -31.007   -31.072   -30.943
----------
cluster: 3
groups: 1
obs:    6856
        estimate   lower95    upper95
(intercept) 11687.473 11681.581 11693.365
t        -28.256   -28.340   -28.172
---------- plot the resulting fit(s)
plot(dat$t, dat$chg, xlab='cum_HNAM_session_time', ylab='CHG')
for(i in 1:length(fitl$m)) {
  abline( a=fitl$m[[i]][1], b=fitl$m[[i]][2] )
}
```

FIG. 8B

COMPUTER-BASED MEASUREMENT OF PRODUCTION EVENTS USING AUTOMATED TIMERS ACROSS MULTIPLE CLIENT-SERVER SYSTEMS

CROSS REFERENCE TO RELATED APPLICATIONS

This application is a continuation of nonprovisional U.S. patent application Ser. No. 14/605,668, filed Jan. 26, 2015, titled "Time-Feature-Driven Activity-Based Costing," which claims the benefit of U.S. Provisional Application No. 61/930,949, titled "Cluster Discovery And Modeling For Time-Feature-Driven Activity-Based Costing," filed Jan. 24, 2014, both of which are incorporated herein by reference in their entireties.

INTRODUCTION

Most financial costing theory presumes that costs monotonically increase with increasing time spent by the personnel or other resources engaged in the production process. But in many enterprises (including health services) this is not necessarily the case. Getting well or staying healthy is not a passive or vegetative process, and the relationship between illness episode costs or cumulative costs incurred by a health plan may be curvilinear or may even decrease as a function of increasing provider time expended. This is especially likely in the case of chronic conditions for which intensive interventions and monitoring and frequent decision-making to personalize and adjust the plan of care are strongly associated with prevention of costly complications.

Recently, enterprises increasingly utilize online record systems that track the expenditure of time associated with each performance of activities that comprise a business process. For example, in Cerner's Millennium® electronic health record software there is a response time measurement system that is governed by a timer.cerner file. The timer system measures more than 1,200 functions that are defined for more than 54 applications in the Cerner software suite. The automated timers measure and store the actual time a user has to wait for the application's focus to be returned to each user, including the roundtrip transaction time for each activity performed by the EHR user online. Optionally, the automated timer information may include designation of the patient to whom each transaction pertained. However, it is always not necessary to have such detail. It is optionally possible to associate the user timer activity data with dates-times during which the patient's episodes occurred; the cumulative user application time during those dates-times is then taken as reflecting the activity that the user incurred on behalf of the set of patients in his/her care during that period. Using HP Vertica® massively-parallel database, Cerner is able to load and analyze more than 10 billion Response Time Measurement System (RTMS) timers per month across all of its client systems.

As a result of having such detailed information, some embodiments of the invention described herein make it is feasible to do the following: 1. Discover clusters and regressions in data from feature-classified labeled groups; and 2. Discover clusters and regressions in unlabeled, ungrouped data and then establish classifier by multinomial logistic regression, neural network, CART, bagging, random forest or tree methods.

In the health care industry, Stage 1 of the U.S. federal Meaningful Use rulemaking in health information technology addressed patient access and capture of health information; Stage 2 addressed information exchange and care coordination. Stage 3 Meaningful Use initiatives places emphasis on improving health outcomes, improving cost-effectiveness and value in health services, and reducing disparities (see http://www.healthit.gov/policy-researchers-implementers/meaningful-use). However, the causes of various outcomes are not obvious, nor are various interventions that plausibly could influence outcomes equally affordable or efficacious. Further, implementation of any intervention entails extensive procedural and programmatic changes, such that it is unreasonable to expect to successfully address the issue by trial-and-error. Therefore, to respond to Stage 3 MU objectives, it is desirable to leverage data to identify what are the drivers of favorable and unfavorable outcomes, and what are the drivers of costs associated with those outcomes. It is then preferable to use that information to systematically design and plan interventions that have a high probability of success, and to quantitatively simulate what the consequences of those interventions will be and perform sensitivity analyses under different assumptions with regard to the populations of persons receiving care services, with regard to the composition of the health care system and its staff and resources, and other factors.

Four major categories of activities identified in an activity-based costing system are as follows:
(a) Unit-level activities: Must be done for each unit of production.
(b) Batch-level activities: Must be performed for each production batch.
(c) Product-sustaining activities: Needed to support the existence of a product line, without regard to how much or little product is produced or sold.
(d) Facility-level (or general-operations-level) activities: Required for the entire production business process to be conducted.

The automated RTMS timer data are able to measure not only unit-level activities but also batch-, product-, and facility-level activities.

Enterprises that have successfully implemented an initial "pilot" ABC model, designed with modest detail granularity (more aggregation or summarization) yet with acceptable cost accuracy, may benefit by iteratively revising and disaggregating the model and its subordinate activities (e.g., divide work activities into sub-activities; divide product families into individual products).

Most companies that use an integrated and automated ABC model proceed to regularly re-running the model as a periodic event (e.g., quarterly or annually). However, very few such companies actually update their models' equations on a frequent or recurring basis. Failure to do so leads to progressive errors and inaccuracy, with degraded calibration of the model over time. Moreover, in today's manufacturing and services environments an increasing proportion of total costs do not vary with volume, and the continued use of conventional costing procedures or purely time-driven activity-based costing models can have serious dysfunctional consequences for the cost information which is generated and used within firms.

SUMMARY

Systems, methods and computer-readable media are provided for optimizing the cost accounting for goods and services is provided, including the automatic discovery of the existence of distinct segments of business characterized by significantly different cost structure. Where two or more such clusters are identified, some embodiments of the invention automatically establishes the most probable number of such clusters. Further, in some embodiments, for each of said clusters, a regression model to determine the quantitative relationship that resource features, resource cost drivers, activity features, and activity cost drivers have upon object costs may be calculated. Accordingly, embodiments provide a more effective means of determining and forecasting costs associated with complex and highly variable or contingent production processes, compared to traditional means such as those that rely solely on overhead allocation methods or time-driven activity-based costing analysis.

Embodiments of the invention are directed to a system and method for optimizing the cost accounting for goods and services is provided, including the automatic discovery of the existence of distinct segments of business characterized by significantly different cost structure. Where two or more such clusters are identified, the some embodiments automatically establish the most probable number of such clusters. For each of said clusters, a regression model to determine the quantitative relationship that resource features, resource cost drivers, activity features, and activity cost drivers have upon object costs may be calculated.

In one aspect, some embodiments enable reliable determination of the smallest number of groupings or subsets that best explain the causes of costs of a business process or enterprise, in a manner that may subsequently be utilized for designing, planning, or managing the process or enterprise. This is likely to be a more effective means of determining and forecasting costs associated with complex and highly variable or contingent production processes, compared to traditional means that rely solely on overhead allocation methods or time-driven activity-based costing analysis.

BRIEF DESCRIPTION OF THE DRAWINGS

The present invention is described in detail below with reference to the attached drawing figures, wherein:

FIGS. 3A-5C illustratively depict results of cluster discovery for three populations of patients including patients with hip replacement, hypertension, Type 2 diabetes, in accordance with an embodiment of the invention;

FIG. 6A-6D illustratively provides an example embodiment of a computer program routine for determining Dirichlet-process Bayesian sampling-based discovery of clusters and related operations for a population of patients with hip replacement, in accordance with an embodiment of the invention;

FIG. 7A-7I illustratively provides an example embodiment of a computer program routine for determining Dirichlet-process Bayesian sampling-based discovery of clusters and related operations for a population of patients with hypertension, in accordance with an embodiment of the invention; and FIG. 8A-8B illustratively provides an example embodiment of a computer program routine for determining Dirichlet-process Bayesian sampling-based discovery of clusters and related operations for a population of patients with Type-2 Diabetes, in accordance with an embodiment of the invention.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As one skilled in the art will appreciate, embodiments of our invention may be embodied as, among other things: a method, system, or set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information, including computer-storage media and communications media. Examples of stored information include computer-useable instructions, data structures, program modules, and other data representations. Computer storage media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, other magnetic storage devices, and other computer hardware or storage devices. These technologies can store data momentarily, temporarily, or permanently.

Embodiments of the present invention provide systems and methods for optimizing the cost accounting for goods and services is provided, including the automatic discovery of the existence of distinct segments of business characterized by significantly different cost structure. Where two or more such clusters are identified, the invention automatically establishes the most probable number of such clusters. For each of said clusters, a regression model to determine the quantitative relationship that resource features, resource cost drivers, activity features, and activity cost drivers have upon object costs may be calculated.

Figure 1A:
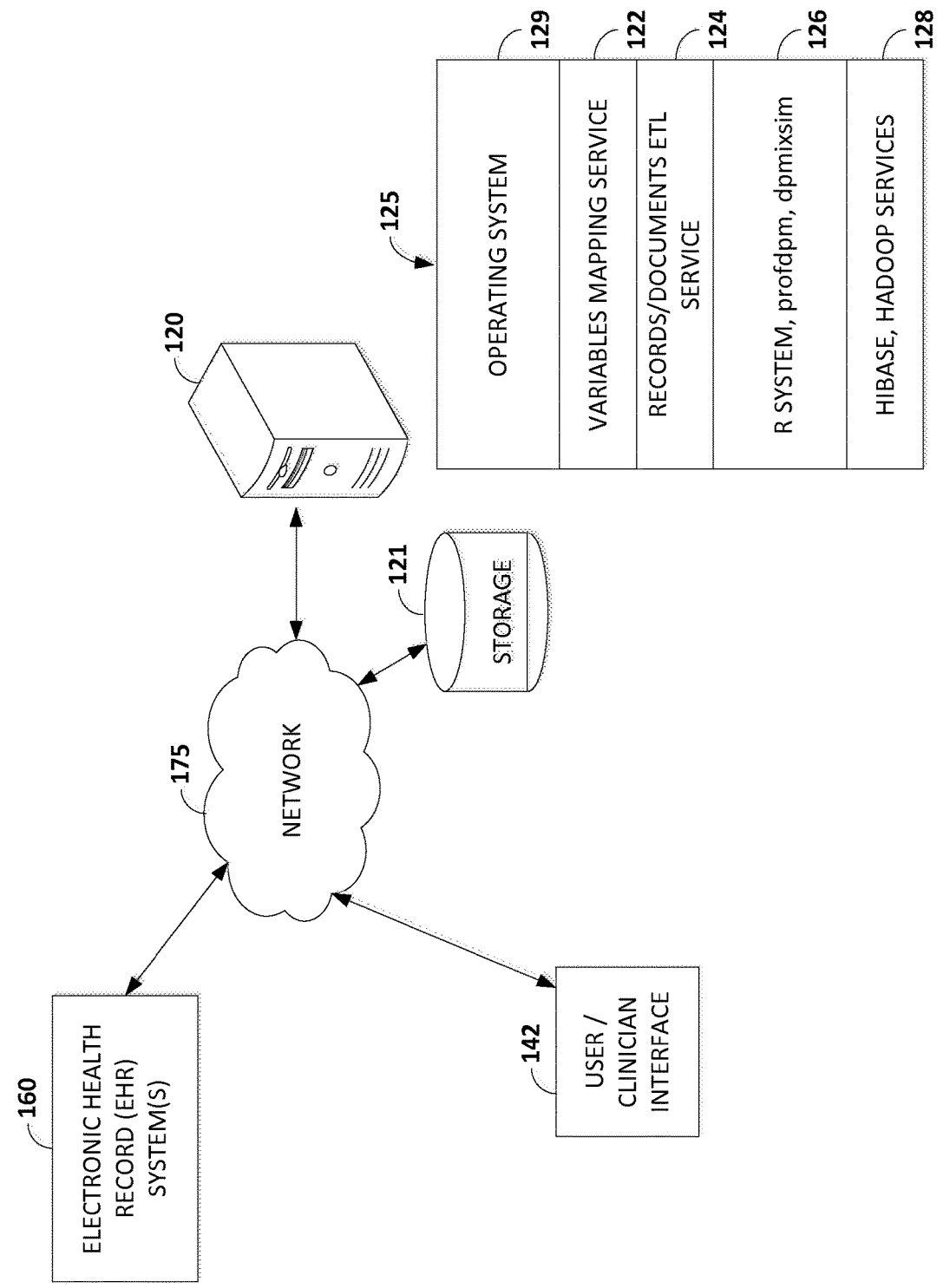
FIGS. 1A and 1B depict aspects of an illustrative operating environment suitable for practicing an embodiment of the invention.

Referring to the drawings in general, and initially to FIG. 1A in particular, an aspect of an operating environment 101 is provided suitable for practicing an embodiment of our invention. We show certain items in block-diagram form more for being able to reference something consistent with the nature of a patent than to imply that a certain component is or is not part of a certain device. Similarly, although some items are depicted in the singular form, plural items are contemplated as well (e.g., what is shown as one data store might really be multiple data-stores distributed across multiple locations). But showing every variation of each item might obscure the invention. Thus for readability, we show and reference items in the singular (while fully contemplating, where applicable, the plural).

As shown in FIG. 1, example operating environment 100 provides an aspect of a computerized system for compiling and/or running embodiments of a cluster discovery and modeling for time-feature-driven activity-based costing (TFDABC). Environment 100 includes one or more electronic health record (EHR) systems, such as hospital EHR system 160, communicatively coupled to network 175, which is communicatively coupled to computer system 120. In some embodiments, components of operating environment 101 that are shown as distinct components may be embodied as part of or within other components of environment 100. For example, EHR systems 160 may comprise one or a plurality of EHR systems such as hospital EHR systems, health information exchange EHR systems, ambulatory clinic EHR systems, psychiatry/neurology EHR systems, and may be implemented in computer system 120. Similarly, EHR system 160 may perform functions for two or more of the EHR systems (not shown).

In embodiments, network 175 includes the Internet, and/or one or more public networks, private networks, other communications networks such as a cellular network, or similar network(s) for facilitating communication among devices connected through the network. Network 175 may be determined based on factors such as the source and destination of the information communicated over network 175, the path between the source and destination, or the nature of the information. For example, intra-organization or internal communication may use a private network or virtual private network (VPN). Moreover, in some embodiments items shown communicatively coupled to network 175 may be directly communicatively coupled to other items shown communicatively coupled to network 175.

In some embodiments, operating environment 100 may include a firewall (not shown) between a first component and network 175. In such embodiments, the firewall may reside on a second component located between the first component and network 175, such as on a server (not shown), or reside on another component within network 175, or may reside on or as part of the first component.

Embodiments of electronic health record (EHR) system 160 include one or more data stores of health records, which may be stored on storage 121, and may further include one or more computers or servers that facilitate the storing and retrieval of the health records. In some embodiments, EHR system 160 may be implemented as a cloud-based platform or may be distributed across multiple physical locations. EHR system 160 may further include record systems, which store real-time or near real-time patient (or user) information, such as wearable, bedside, or in-home patient monitors, for example.

Example operating environment 100 further includes provider user/clinician interface 142 communicatively coupled to network 175. Embodiments of interface 142 may take the form of a user-clinician interface operated by a software application or set of applications on a client computing device such as a personal computer, laptop, smartphone, or tablet computing device. In one embodiment, the application includes the PowerChart® software, manufactured by Cerner Corporation. In an embodiment, the application is a Web-based application or applet. A provider clinician application facilitates accessing and receiving information from a user or health care provider about a specific patient or population of patients including patient history, health care resource data, cluster-related information or other health-related information. In some embodiments interface 142 also facilitates receiving orders for the patient from the clinician/user, based on the results. In some embodiments, interface 142 may also be used for providing diagnostic services.

Example operating environment 100 further includes computer system 120, which may take the form of a server, which is communicatively coupled through network 175 to EHR system 160, and storage 121.

Computer system 120 comprises one or more processors operable to receive instructions and process them accordingly, and may be embodied as a single computing device or multiple computing devices communicatively coupled to each other. In one embodiment, processing actions performed by system 120 are distributed among multiple locations such as one or more local clients and one or more remote servers. In one embodiment, system 120 comprises one or more computing devices, such as a server, desktop computer, laptop, or tablet, cloud-computing device or distributed computing architecture, a portable computing device such as a laptop, tablet, ultra-mobile P.C., or a mobile phone.

Embodiments of computer system 120 include computer software stack 125, which in some embodiments operates in the cloud, as a distributed system on a virtualization layer within computer system 120, and includes operating system 129. Operating system 129 may be implemented as a platform in the cloud, and which is capable of hosting a number of services such as 122, 124, 126, and 128. Some embodiments of operating system 129 comprise a distributed adaptive agent operating system. Embodiments of services 122, 124, 126, and 128 run as a local or distributed stack in the cloud, on one or more personal computers or servers such as system 120, and/or a computing device running interfaces 140 and 142. In some embodiments, interface 142 operates in conjunction with software stack 125.

In embodiments, variables mapping (or indexing) service 122 and records/documents ETL service 124 provide services that facilitate retrieving frequent item sets, extracting database records, and cleaning the values of variables in records. For example, service 122 may perform functions for synonymic discovery, indexing or mapping variables in records, or mapping disparate health systems' ontologies, such as determining that a particular medication frequency of a first record system is the same as another record system. In some embodiments, these services may invoke software services 126.

Software services 126 perform statistical software operations, and include statistical calculation packages such as, in one embodiment, the R system (the R-project for Statistical Computing, which supports R-packages or modules tailored for specific statistical operations, and which is accessible through the Comprehensive R Archive Network (CRAN) at http://cran.r-project.org); R-system modules or packages including for example, profdpm and dpmixsim packages, or similar services. In an embodiment, software services 126 include the services or routines, which may be embodied as one or more software agents, for determining cluster discovery and modeling for TFDABC such as the examples illustratively depicted in FIGS. 6A-8B using Dirichlet Process Bayesian sampling for cluster identification, multinomial logistic regression, and/or Hausman-McFadden test for determining relevancy and validity of model variables determined. In some embodiments, software services 126 are associated with framework services 128, which in one embodiment include Apache Hadoop and Hbase framework, or similar frameworks operable for providing a distributed file system, and which in some embodiments facilitate provide access to cloud-based services such as those provided by Cerner Healthe Intent@.

Example operating environment 100 also includes storage 121 or data store 121, which in some embodiments includes patient data for a candidate or target patient (or information for multiple patients); variables associated with patient recommendations; recommendation knowledge base; recommendation rules; recommendations; recommendation update statistics; an operational data store, which stores events, frequent itemsets (such as "X often happens with Y", for example), and item sets index information; association rulebases; agent libraries, solvers and solver libraries, and other similar information including data and computer-usable instructions; patient-derived data; and health care provider information, for example. It is contemplated that the term data includes any information that can be stored in a computer-storage device or system, such as user-derived data, computer usable instructions, software applications, or other information. In some embodiments, data store 121 comprises the data store(s) associated with EHR system 160. Further, although depicted as a single storage data store, data store 121 may comprise one or more data stores, or may be in the cloud.

Figure 1B:
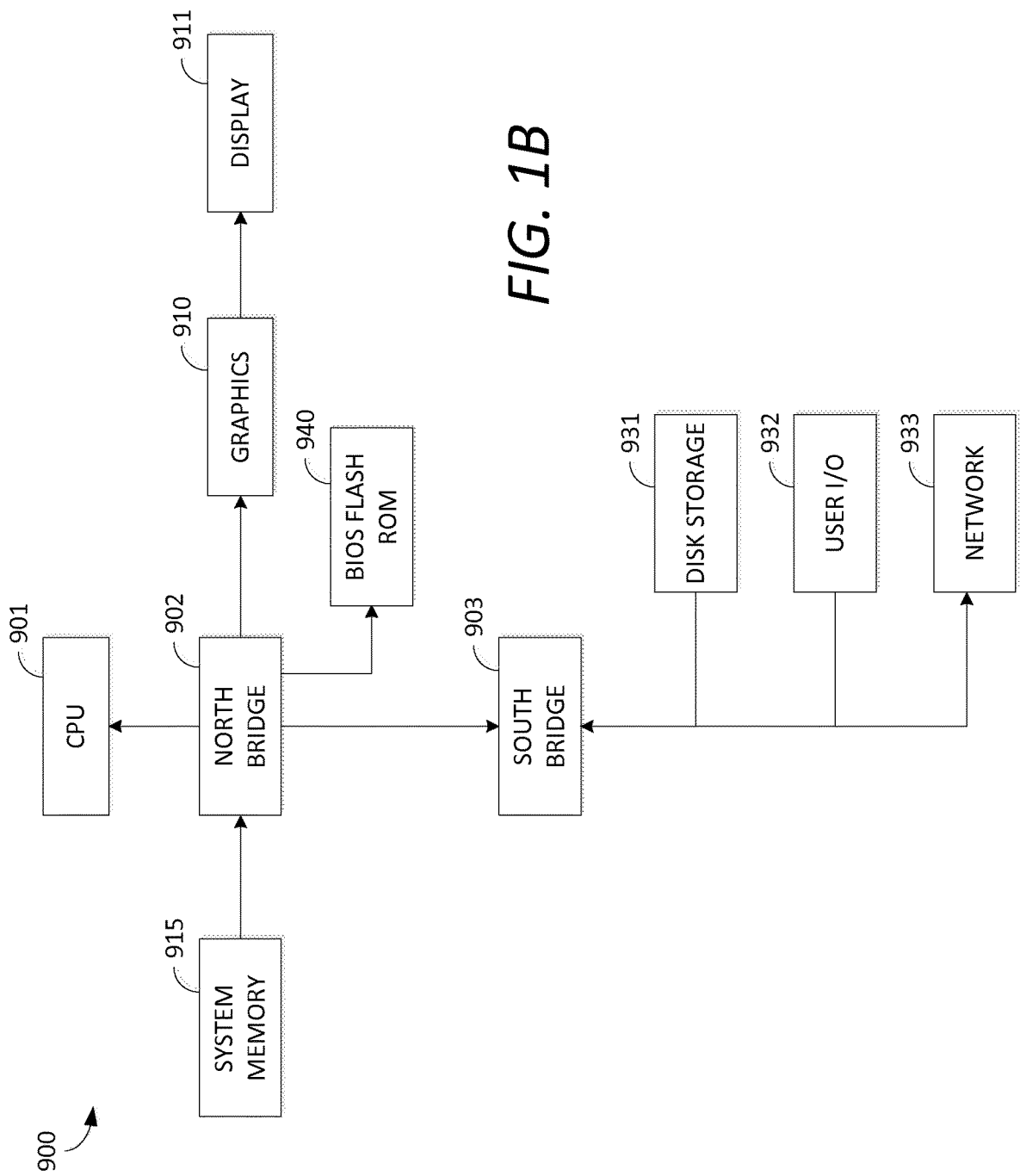

Turning briefly to FIG. 1B, there is shown one example embodiment of computing system 900 that has software instructions for storage of data and programs in computer-readable media. Computing system 900 is representative of a system architecture that is suitable for computer systems such as computing system 120. One or more CPUs such as 901, have internal memory for storage and couple to the north bridge device 902, allowing CPU 901 to store instructions and data elements in system memory 915, or memory associated with graphics card 910, which is coupled to display 911. Bios flash ROM 940 couples to north bridge device 902. South bridge device 903 connects to north Bridge device 902 allowing CPU 901 to store instructions and data elements in disk storage 931 such as a fixed disk or USB disk, or to make use of network 933 for remote storage. User I/O device 932 such as a communication device, a mouse, a touch screen, a joystick, a touch stick, a trackball, or keyboard, couples to CPU 901 through south bridge 903 as well. The system architecture depicted in FIG. 1B is provided as one example of any number of suitable computer architectures, such as computing architectures that support local, distributed, or cloud-based software platforms, and are suitable for supporting computing system 120.

Returning to FIG. 1A, in some embodiments, computer system 120 is a computing system made up of one or more computing devices. In some embodiments, computer system 120 includes one or more software agents, and in an embodiment includes an adaptive multi-agent operating system, but it will be appreciated that computer system 120 may also take the form of an adaptive single agent system or a non-agent system. Computer system 120 may be a distributed computing system, a data processing system, a centralized computing system, a single computer such as a desktop or laptop computer or a networked computing system.

Figure 2A:
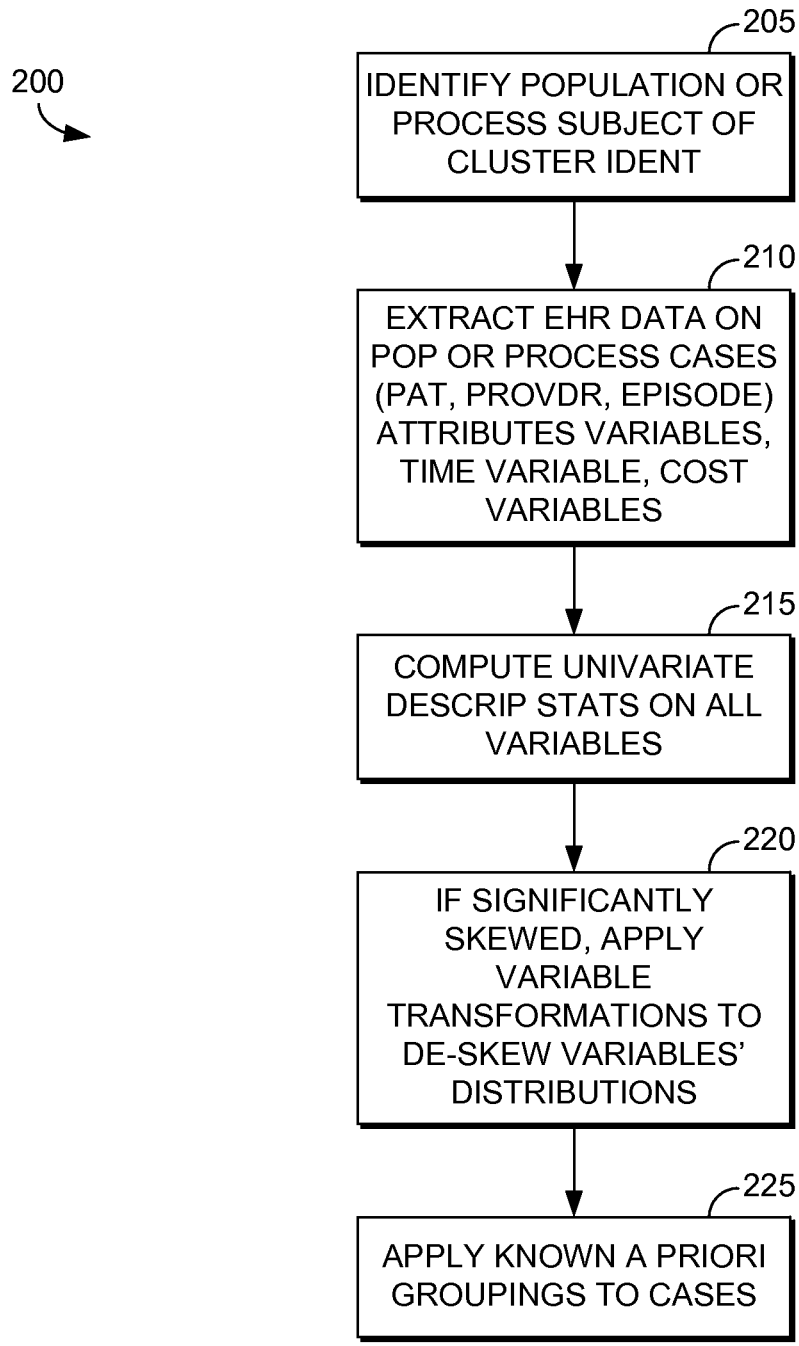
FIGS. 2A-2B depicts flow diagrams methods for cluster discovery and modeling for time-feature-driven activity-based-costing, in accordance with embodiments of the invention.
Figure 2B:
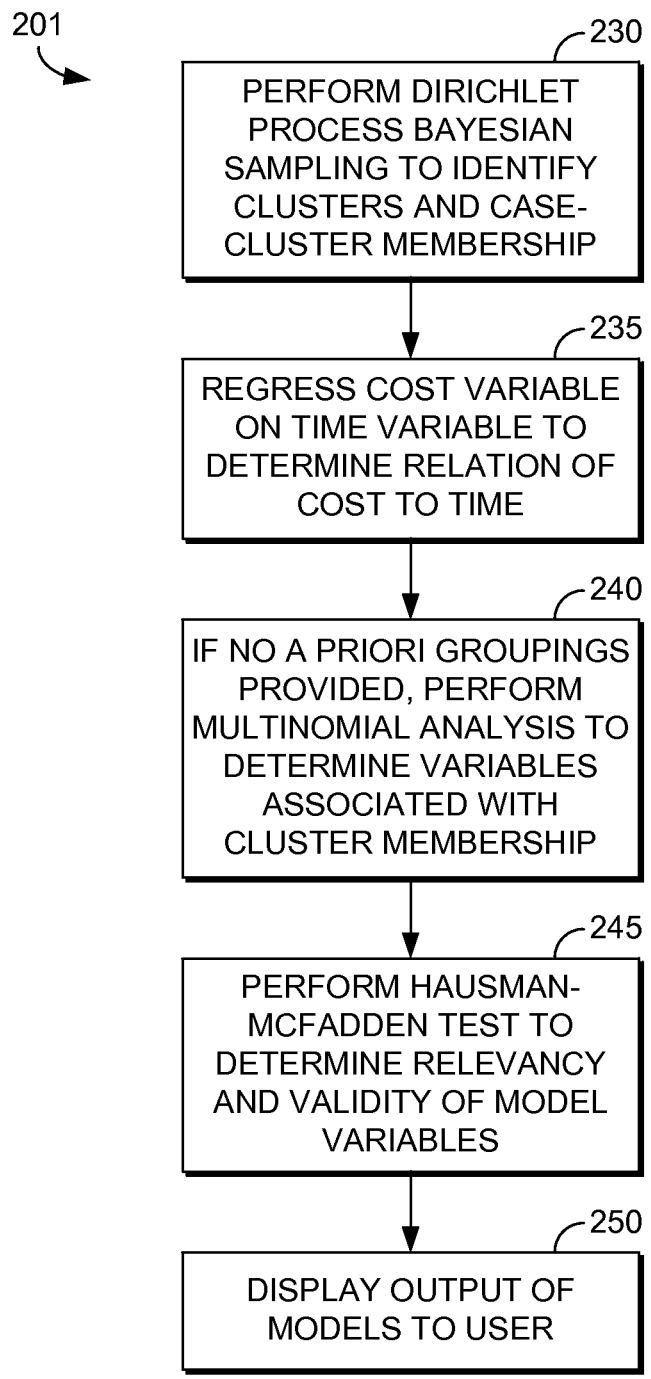
Figure 2C:
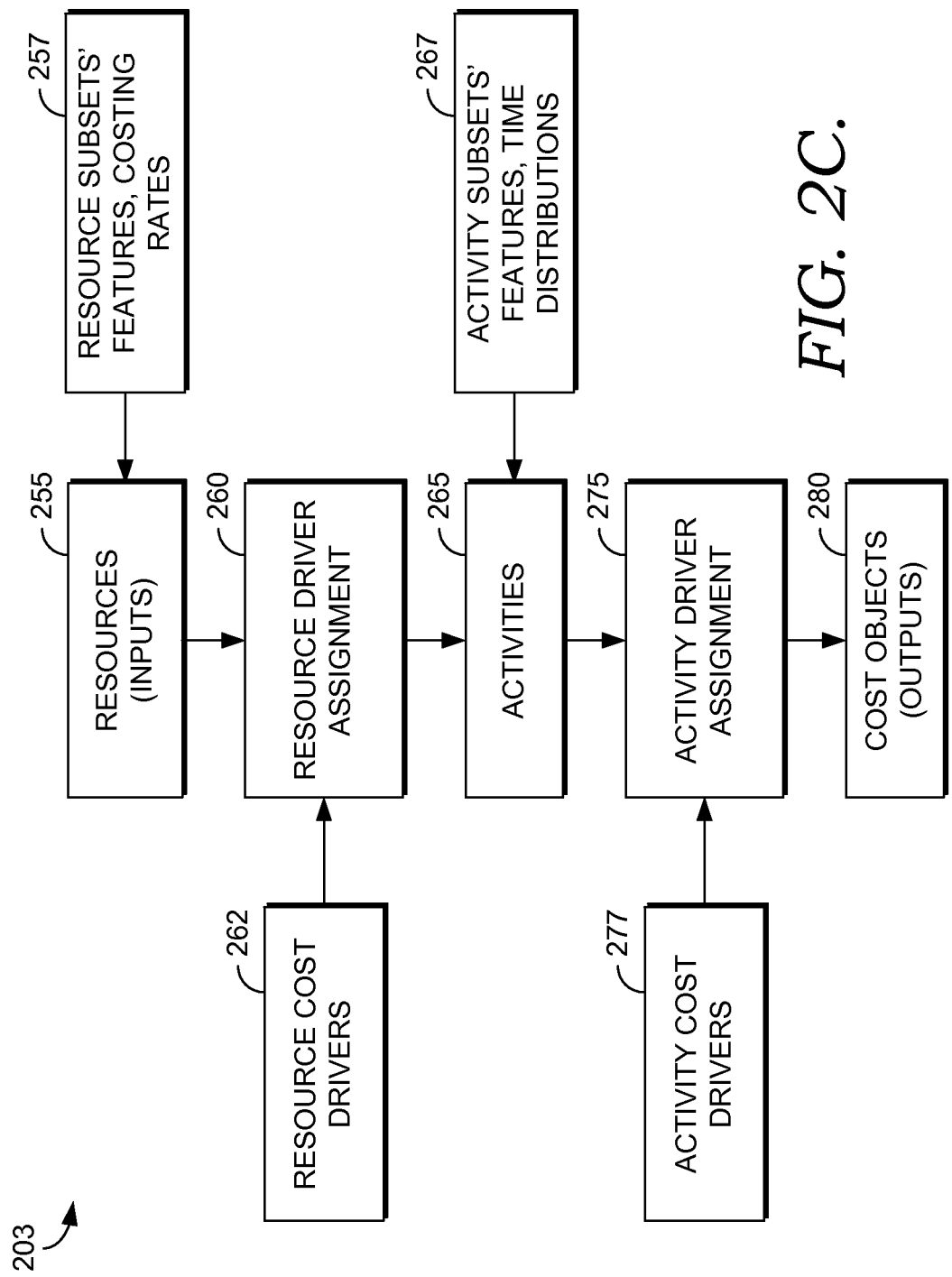
FIG. 2C depicts an example health-care resources flow environment including activities performed with resources, and costs, for practicing an embodiment of the invention.

Turning now to FIGS. 2A-2C, methods for cluster discovery and modeling for time-feature-driven activity-based-costing are provided and referred to generally as methods 200 and 201, respectively. FIG. 2C depicts an example flow diagram of healthcare resources activities performed with resources, and costs, in accordance with one embodiment. In particular, FIG. 2C shows the relationships between resources (which include staff, physical plant and equipment, customers or other objects of service-oriented work, and raw materials or feedstocks or OEM subassemblies for product-oriented work), activities performed with the resources, and costs.

With reference to these drawings, by way of background and not limitation, progressively more competitive business environment leads enterprises to seek to maintain or improve their competitiveness by identifying and quantitatively analyzing cost information associated with the production of their goods or services. Historically, companies planned and controlled their operations using accounting information that was assumed to accurately reflect the costs of their products and services. In fact, this assumption was frequently violated. The financial costing systems of many firms, involving averaging and top-down allocation of indirect costs masked a large amount of arbitrariness and imprecision, and provided inaccurate or misleading information to executives. This resulted in suboptimal decision making by these companies' managers.

In order to mitigate inaccuracies of traditional costing systems with their overly-simplistic cost allocations of indirect costs, some firms have attempted to established activity-based costing (ABC) systems. These systems involve cost modeling that traces an organization's costs—both direct and indirect—to the specific products, services, activities, resources, and customers that cause those costs to be incurred. Some firms have experimented with evolving beyond using ABC solely for obtaining more accurate and relevant costing information. In this approach, the focus transitions from ABC to ABM—activity-based management. This approach characterizes the cost drivers—the measures of activity that are causal factors in the incurrence of cost—as a means of improving operations. The improved understanding of a firm's cost structure to proactively manage their resources to optimize key elements of value leads them to trace and assign indirect costs, not simply allocate costs.

ABC traces indirect costs (commonly called "overhead") to products, services, and customers by identifying resources and activities their associated costs. Consumption of specific resources by specific activities is what leads to production of the business's valuable outputs. Examples of resource expenses are salaries, input stocks and supplies, equipment depreciation, and electrical power. They represent the capacity to perform work and generate value. ABC exposes quantitative relationships between work activities and their costs. Activities are groupings of tasks in the same business process that are governed by the same driver and the same intensity of resource consumption. The activities performed by an organization are conventionally identified using activity analysis. This involves determining what activities are done within the department, how many people and of which skills and costing-rates perform the activities, how much time they spend performing the activities, what resources are required to perform the activities, what operational data best reflect the performance of the activities, and the value of the activities to the organization. Historically, these determinations involved extensive interviewing and time-and-motion data gathering. However, some embodiments provided herein facilitate measuring and characterizing activities using online data that accrue as a byproduct of the performance of the activities.

With reference to flow diagram 202 of FIG. 2C, in ABC, resources are traced to activities using resource drivers;

these are used to calculate the cost of each activity that consumes the resources. Activity costs are then traced, using activity drivers, to each product or service (i.e., cost object) that consumes a given activity. This is done by determining how many units of activity output each cost object consumed during any given period of time.

ABC is tantamount to full absorption costing but without violating rules of causality as was frequently the case with traditional accounting allocations of indirect expenses. To validate ABC analyses, managerial economics can be applied, including marginal cost analysis that classifies expenses as a function of changes in product or service mix and changes in output volumes as variable, stepwise-fixed, or fixed. Such analysis can also distinguish the difference between capacity provided and capacity used and consider the presence of unused available capacity. Full absorption costing in an ABC context does not mean that 100% of a period's costs are traced to customer-related products, services, and channels. Costs not related to customers, including unused capacity costs, are ordinarily traced to a final cost object called "business sustaining costs".

Resource drivers for employees reflect the time they spend performing work activities. Resource drivers for indirect material purchased items reflect their usage by an activity, such as energy expense's kilowatts by a machine. Activity drivers are a measure of the output of an activity. For example, for the customer-related work activity, "processing a sales order," the activity driver would be the number of sales orders processed. The costing principle is that costs incurred vary linearly in proportion to the amount of each driver utilized.

Business-sustaining costs are activity costs not incurred by making products or delivering services to customers. The consumption of these costs in general cannot necessarily be logically traced to specific products, service-lines, channels, or customers. They can be provisionally allocated, but not with a causal relationship. In health care services, these include the time that clinicians spend contemplating and planning, or temporizing until the right moment to act arrives (unused capacity; waiting time; extra capacity to be able to handle catastrophes and routine fluctuations in demand volume), or context-switching when more urgent events interrupt activities that were underway, or coordinating and triaging activities of different levels of importance. Attributes do not alter the cost of anything calculated by ABC, but they facilitate grouping activity costs into various categories that in turn help focus management attention (e.g., nonvalue-adding costs) and can suggest appropriate management actions.

Time equations can be used to model business process complexity when the number of variations makes the use of multiple activities impractical. Time equations are applied directly to transactions, products or customers. In this methodology, the cost influencing parameters of a customer order are identified and a time estimate made for each one as follows: Rush Order=3 minutes, New Customer=6 minutes and Order Placement=8 minutes. For a rush order with a new customer the time equation would be 3+6+8=17 minutes. For a rush order the time equation would be 3+8=11 minutes. Instead of being averages, the time units are calculated using the time equations. If the resource cost were $0.80 per minute the first order would receive $13.60 of cost and the second $8.80. To implement this method requires that the detail order transactions from the ERP system be integrated with the ABC software so that the time equations can be applied.

In some of the embodiments described herein of a time-feature-driven Activity-Based Cost (TFDABC) method, activity costs are assigned to cost objects in the usual way. In Activity Analyzer this means that a bill of activity is used to relate activities to cost objects and each activity's cost rate is applied to the cost object's driver quantities. Compiling driver quantities for the cost objects can be an extremely time consuming task. Activity Analyzer provides the capability to calculate activity driver quantities based on the rate at which cost objects consume their activities. Instead of compiling how many times an activity was performed for each cost object, managers simply estimate the rate at which each cost object consumes the activities assigned to it.

An activity's trigger is the preceding event that indicates that the activity should be performed. The activity's root cause is the event or activity that, if it had not occurred, would have prevented the activity in question from happening. For example, the event that triggers the activity of rework is the identification of a defective part during inspection. However, the inspection is not the root cause of the rework activity. The root cause of the defective part, and hence the need for rework, could lie in erroneous part specifications, in an unreliable vendor, or in faulty production.

Traditional cost accounting has been criticized for cost distortion and lack of relevance during the last 30 years. A new costing method, activity-based costing (ABC), was developed and has been advocated as a means of overcoming the systematic distortions of traditional cost accounting and for bringing relevance back to managerial accounting. A traditional system reports what money is spent on and by whom, but fails to report the cost of activities and processes. Many organizations including petroleum and semiconductor companies in the manufacturing industry have adopted the new costing method.

There are two purposes of activity-based costing. The first purpose is to prevent cost distortion. Cost distortion occurs because traditional costing combines all indirect costs into a single cost pool. This pool is allocated on the basis of some resource common to all of the company's products, typically direct labor. Cost distortion is prevented in ABC by adopting multiple cost pools (activities) and cost drivers. The second purpose is to minimize waste or non-value-adding activities by providing a process view. This objective can be achieved by activity analysis with multiple cost pools (activities) and cost drivers.

An activity-based costing system is a two-stage process of assigning costs to products. In stage one, activity-cost pools are established. In stage two a cost driver is identified for each activity-cost pool. Then the costs in each pool are assigned to each product line in proportion to the amount of the cost driver consumed by each product line. The major distinction between traditional cost accounting and ABC is that ABC uses multiple cost drivers to assign activity costs to products or services. The final output of an activity-based costing is cost driver information. Understanding the causal relationship between an activity and its cost driver enables management to focus improvement efforts on those areas that will produce the best results. Because causal relationships may change over time, cost drivers for each activity may also change, necessitating updating of the ABC model. Therefore an object of some embodiments is to check and update the activity data to make sure that appropriate cost drivers are being used.

[Other approaches to ABC include a number of deficiencies or limitations including:
(1) Inadequate or inaccurate representation of the true origins of costs, particularly for service industries and processes that have significant variability from performance to performance or significant 'contingent' structure.
(2) Requirement for intensive effort by scarce, expensive, highly-skilled analysts to construct and to revise cost models, resulting in a significant barrier to models' widespread development and use, and to financial barriers to updating models so as to ensure their accuracy over time.
(3) ABC typically covers a short time period such as a month, quarter, or year. Products and customers, however, pass through various phases of a life-cycle, from inception to maturity to decommissioning. ABC attributes excessive product costs during a product's early stages, when it requires development effort or increased attention to stabilize production. A product that may be characterized as unprofitable initially may be profitable in the future as those early-phase costs recede.
(4) Inadequate recognition of attributes or features that pertain to major subcategories or groupings of work comprising the business process, even when time-driven aspects are taken into account, such that the resulting TDABC models are inaccurate or fail to identify the most important factors that cause costs to be incurred.

Accordingly, it is therefore highly valuable and highly desirable to provide embodiments of the methods and systems described herein for ameliorating these limitations and providing objective, quantitative means for determining the existence and number of clusters or segments of production within an enterprise and for determining costs as a function of the proportions of these. In some embodiments, it is further valuable to determine a forecast of the costs that would be consequent upon an altered mix of resources or activities.

With continuing reference to FIGS. 2A and 2B, at a high level, embodiments of methods 200 and 201 comprise the following steps.

At steps 205-225 of method 200, the relevant resource, activity and activity time, process, cost, and feature data for a business process that is to be the subject of activity-based cost analysis are identified and if necessary assembled. In some embodiments, if necessary, mathematical transformations of the data are carried out, to mitigate skewness or other anomalies in the variables' statistical distributions. In particular, in one embodiment of such a method: at step 205, identify population or process that is to be subject of cluster identification and pattern discovery. At step 210, extract cost data, for including customer and producer and episode attributes variables and at least one time variable and one cost variable. At step 215, compute univariate descriptive statistics, including first, second, third, and fourth moments. At step 220, if necessary, transform variables to de-skew distributions. At step, 225, apply known a priori groupings, if available or if desired.

At step 230 of method 200, Bayesian Dirichlet Process sampling is then performed to automatically determine a minimum number of clusters within the data. (Perform Dirichlet Process Bayesian sampling to identify clusters and each case's cluster membership i={1, . . . , N}.)

At step 235, regress cost variable on time variable to determine quantitative relationship of cost to time. Statistical regressions are performed on each cluster identified in step 2, regressing the cost variable on the time variable for members of each cluster, to determine the mathematical relationship between activity time and cost for each cluster. (Example embodiments of software services 126 for performing step 230 is shown within the example programs of FIGS. 6A-6D, 7A-7I, and 8A and 8B.)

At step 240, the feature values that are associated with each cluster are examined, to determine the attributes that govern membership of activity instances in each cluster. If no a priori groupings were provided, perform multinomial logistic regression to determine variables associated with cluster membership.

At step 245, determine the statistical validity and adequacy of the cluster partition that is established, using the Hausman-McFadden or similar test. If the 'independence of irrelevant alternatives' assumption is satisfied, the probability ratio of every pair of alternative clusters depends only on the characteristics of these alternatives. Consequently, the results obtained on the estimation with all the alternatives or only on a subset of them are consistent, but more efficient in the first case. In some embodiments, in general, only the results obtained from the estimation on a relevant subset are consistent. To compute the Hausman-McFadden test, a model estimated with all the alternatives and one model estimated on a subset of alternatives is used.

At step 250, the output results may be displayed to a user using, for example user/clinician interface 142.

Stochastic models are used extensively in machine-learning to model distributions and formulate inferences over arbitrary observed data. Traditional parametric models using fixed, finite-cardinality parameters may suffer from over-fitting or under-fitting or other mis-specification of model structure. Thus, model specification or model discovery—the identification of a model with the right amount of complexity to accurately account for the observed data—is a fundamental aspect of devising a successful, useful model.

The Bayesian nonparametric alternatives to parametric models can, in principle, have unconstrained complexity, so that the risk of under-fitting is mitigated and the dependency on human skill in model-specification is likewise mitigated. Bayesian inferencing involves randomized sampling, assigning 'prior' statistical distributions to all of the unknown quantities in a mathematical model. Among the unknown quantities that pertain to modeling activity-based costing are (1) the number of distinct subgroupings or clusters of activities whose costs and cost relationships to time variables differ and (2) the proportion that each such cluster represents as a component of the whole. Uncertainty about the parametric form of a distribution, or about the sufficient accuracy of representing a prior distribution via a parametric form, can motivate using a non-parametric prior distribution. In the art of modeling, the Dirichlet Process (DP) provides a convenient means to model uncertainty about the parametric form or stochastic parameter values in a model, particularly in process mixture models. The Dirichlet Process can be defined as a normalization of a gamma process or, alternatively, as a generalization of a Polya urn process or a stick-breaking process.

For some embodiments, each sample drawn from a DP is itself a statistical distribution. DP derives its name from the fact that each sample has Dirichlet-distributed marginal distributions, in a manner analogous to Gaussian processes, which have Gaussian-distributed marginal distributions. Distributions sampled from a DP are discrete and cannot be characterized by a finite number of parameters, hence, the classification of DP as a non-parametric model.

Often the goal of analysis is to discover latent subgroupings or clusters in the observed data and identify the features or variables that optimally discriminate among the clusters. Accordingly, some embodiments of the invention utilize any of a variety of means of variable- or feature-selection in clustering in DP mixture models, which may be implemented using available software packages such as the BUGS Gibbs sampler or the profdpm sampler (software services 126) in the R language. Determination of the optimal number of clusters may be performed by minimizing the Akaike Information Criterion (AIC) or Bayesian Information Criterion (BIC) or other metrics, as are routinely employed by practitioners of the art. Then, having settled on a parsimonious, optimal number of clusterings of the observations, another aspect of the invention applies conventional statistical regression methods to each of said clusters, to establish the quantitative relationship between time-variable(s) and the costs that arise in the process pertaining to each cluster.

Turning now to FIGS. 3A-5C, three sets of results from three actual reductions to practice of embodiments of methods 200 and 201 are provided. FIGS. 3C, 4C, and 5C include a representative portion of raw data used for in the three reductions to practice. The embodiments used in these three examples used a system as described in connection to FIG. 1A, wherein a computer system 120 comprised a computer running the Linux operating system, the open-source statistical software package R, and the R modules profdpm and dpmixsim (software services 126).

Figures 3A, 3B:
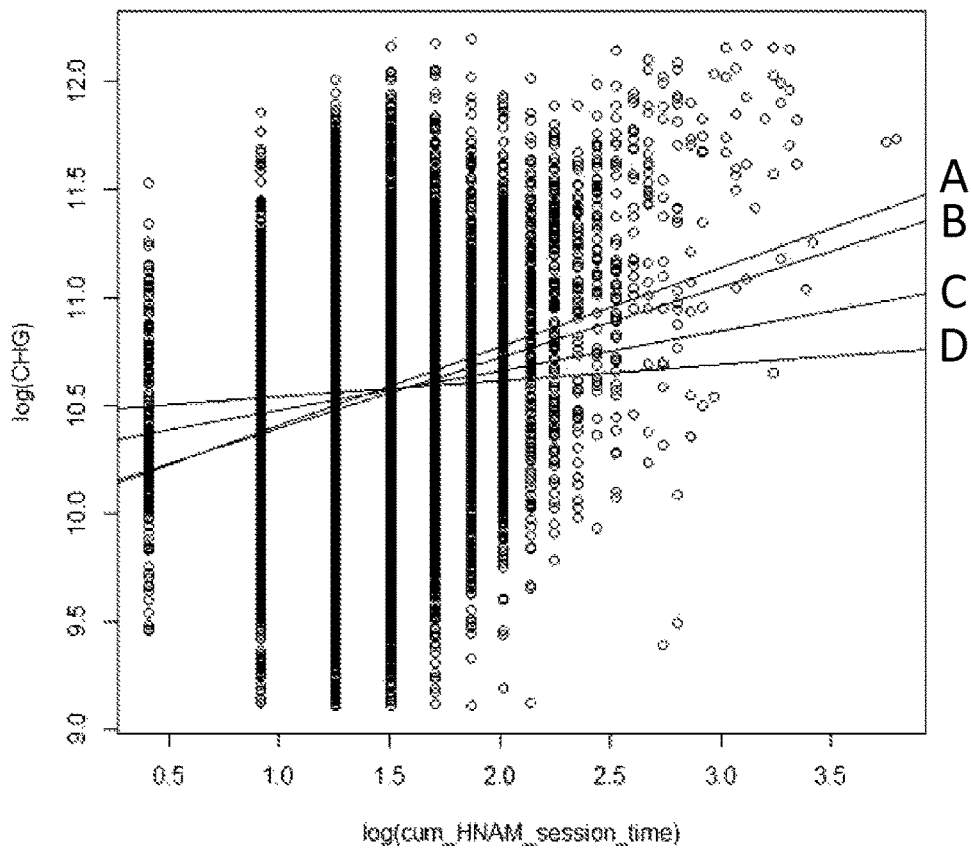

With reference to FIG. 3A-3C, an Example 1 addresses Total Hip Arthroplasty (THA) In-Patient Episode Costs. In this example actual reduction to practice of one embodiment, a series of 23,274 records were selected from a patient health records data warehouse, which is derived from Cerner electronic health record (EHR) from 100% of episodes of care that are incident upon the participating health institutions. The personally-identifiable information was removed in conformance with U.S. HIPAA law and regulations, and the de-identified data were stored in a separate, secure database. We recast the data in the form of time series, and analyzed the sequences using the open-source R statistical packages profdpm and dpmixsim. (An example embodiment of aspects methods 200 and 300 embodied as a computer program for Example 1, is provided in FIGS. 6A-6D.) Utilizing surgeons' average annual THA case volume as a clustering feature, it was found that the highest volume operators take on more difficult/complex cases but have costs that are relatively time-insensitive. By contrast, infrequent operators take on less difficult/complex cases but have costs that are time-sensitive.

FIGS. 3A and 3B show the results of Dirichlet sampling-based discovery of clusters for a population of patients admitted to hospital to receive primary unilateral total hip replacement, for Example 1. As shown in FIG. 3A, 4 clusters (A-D) are determined. From this, it can be seen that the highest volume operators take on more difficult or complex cases but have costs that are relatively time insensitive (C, D). Infrequent operators take on less difficult/complex cases but have costs that are time sensitive (A, B)

Figures 4A, 4B:
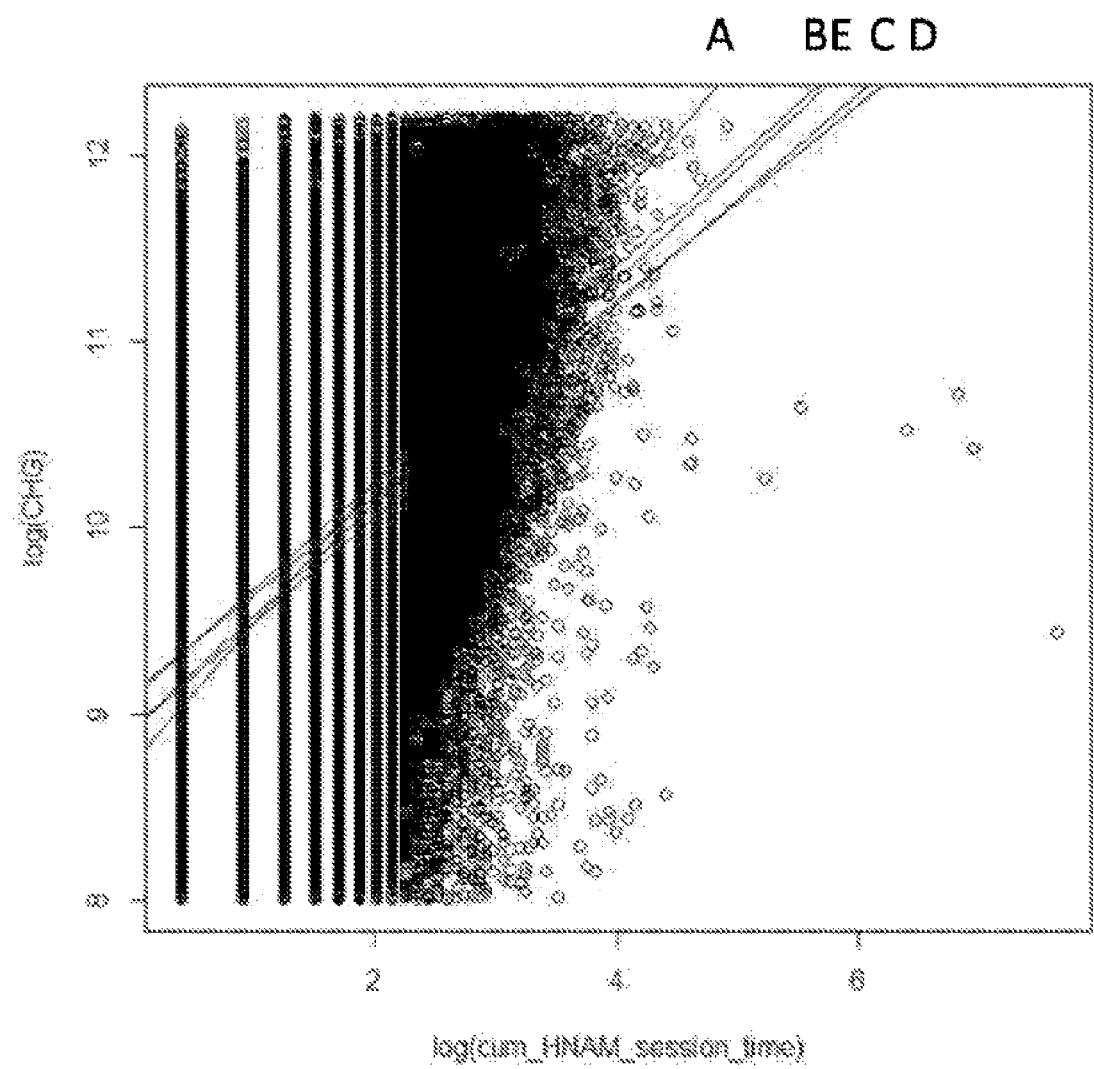

With reference to FIG. 4A-4C, an Example 2 addresses Essential Hypertension In-Patient Episode Costs. In this example actual reduction to practice of one embodiment, a series of 432,604 records were selected from a patient health records data warehouse, which is derived from Cerner electronic health record (EHR) from 100% of episodes of care that are incident upon the participating health institutions. The personally-identifiable information was removed in conformance with U.S. HIPAA law and regulations, and the de-identified data were stored in a separate, secure database. Again the data is recast in the form of time series, and analyzed the sequences using the open-source R statistical packages profdpm and dpmixsim. (An example embodiment of aspects methods 200 and 300 embodied as a computer program for Example 2, is provided in FIGS. 7A-7I.) Using annual case volume as a clustering feature, it was found that the highest volume hospitalists take on both simple complex cases and quickly and cheaply discharge, but have costs that are time sensitive. By contrast, infrequent admitters take on less difficult/complex cases with high base costs but have costs that are quite time-insensitive.

FIGS. 4A and 4B show the results of Dirichlet sampling-based discovery of clusters for a population of hypertensive patients admitted to hospital, for Example 2. As shown in FIG. 4A, 5 clusters (A-E) are determined. From this, it can be seen that the highest volume hospitalists take on both simple and complex cases and quickly and cheaply discharge, but have costs that are time sensitive (A). Infrequent admitters take on less difficult cases with high base costs but have costs that are less time sensitive (B, C, D, E).

Furthermore, analyzing the same by race as a clustering feature, it was found that a majority of Race-3 hypertensives have moderate base costs and incremental costs that are weakly time-sensitive. A subset of Race-2, Race-4, Race-2, and Race-5 hypertensives have low base cost but incremental costs that are highly time-sensitive. Race-1 hypertensives have high base costs but have costs that are quite time-insensitive.

Figures 5A, 5B:
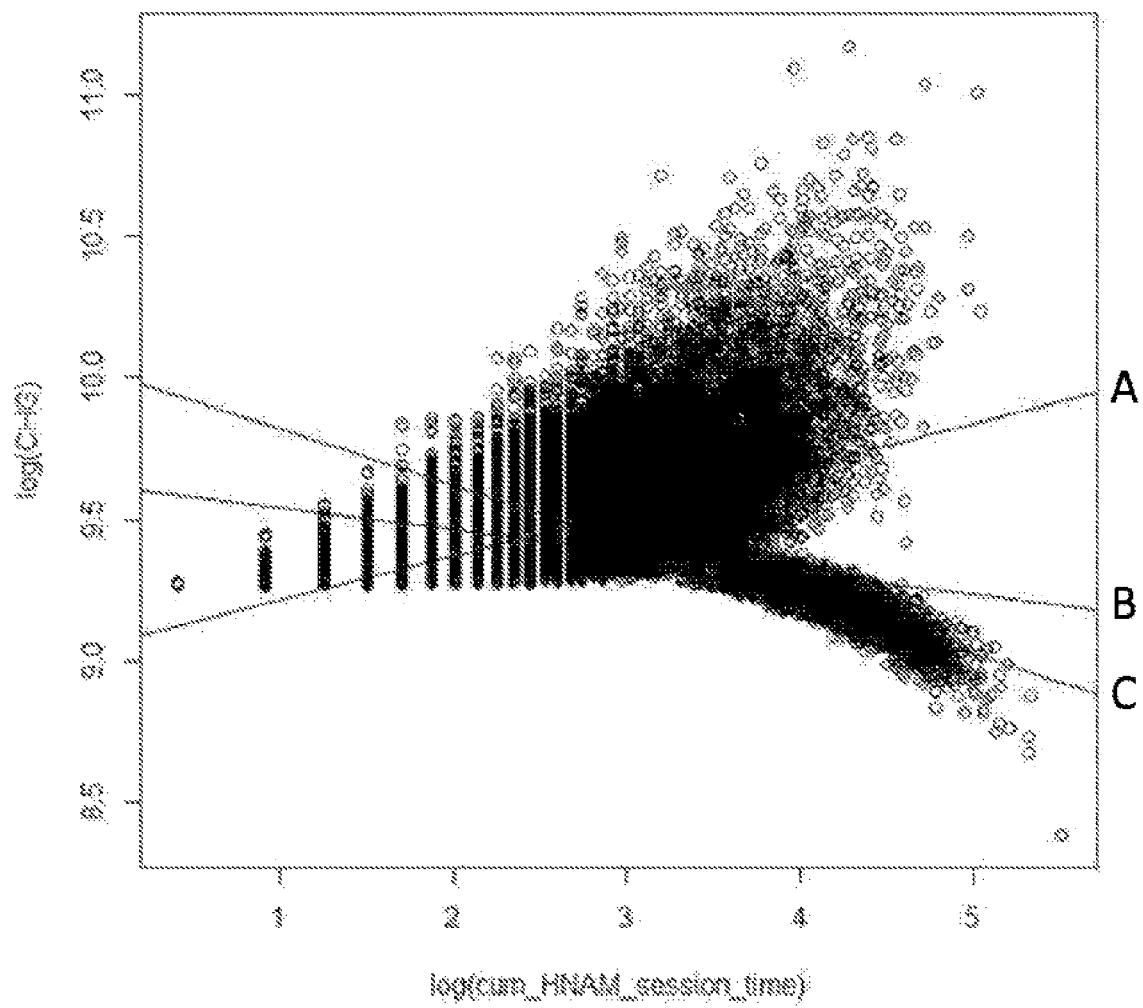

With reference to FIG. 5A-5C, an Example 3 addresses Type 2 Diabetes Annual Plan Costs. In this example actual reduction to practice of one embodiment, a series of 220,468 records were selected from a patient health records data warehouse, which is derived from Cerner electronic health record (EHR) from 100% of episodes of care that are incident upon the participating health institutions. The personally-identifiable information was removed in conformance with U.S. HIPAA law and regulations, and the de-identified data were stored in a separate, secure database. Again the data is recast in the form of time series, and analyzed the sequences using the open-source R statistical packages profdpm and dpmixsim. (An example embodiment of aspects methods 200 and 300 embodied as a computer program for Example 1, is provided in FIGS. 8A-8B.)

Diabetic plan adherents' costs decreased with greater provider investment of time for optimizing regimen and coaching. Additionally, some endocrinologist-patient pairs in cluster 3 spent larger and more frequent time optimizing regimen and decrease cost even more. Furthermore, a majority of general internists and family practitioners managing diabetics do not spend very much time per year managing the diabetes. By contrast, nonadherents proved to be unreceptive to coaching due to comorbid depression or other factors and their costs increased commensurately, with more diabetes-related preventable acute complications (PACs) consuming more provider time during the current policy fiscal year.

FIGS. 5A and 5B show the results of Dirichlet sampling-based discovery of clusters for a population of Type 2 diabetic patients, for Example 3. As shown in FIG. 5A, 3 clusters (A-C) are determined. From this, it can be seen that the Adherents' costs decrease with greater provider investment of time for optimizing regimen and coaching (B). Some endocrinologist-patient pairs in cluster 3 spend larger and more frequent time optimizing regimen and decrease cost further (C). A majority of general internists and family practitioners managing diabetics do not spend very much time per year managing the diabetes. Nonadherents' are unreceptive to coaching due to comorbid depression or other factors and costs increase, with more PACs consuming more provider time (A).

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

Accordingly, in one aspect a computer-implemented method is provided for analyzing cost data that originates from a business process wherein a cost data is modeled as a time series, and wherein the method involves ascertaining the mean, variance, skewness, and kurtosis (first through fourth statistical moments) of the cost data.

In another aspect, a computer-implemented method is provided for analyzing cost data that originates from a business process wherein preparing the cost data involves transforming raw cost data by de-meaning, scaling or normalizing, and/or de-skewing the variables' statistical distributions.

In yet another aspect, a computer-implemented method is provided for analyzing cost data that originates from a business process wherein preparing the cost data involves Bayesian Dirichlet Process sampling to automatically determine latent clusters of cases that have characteristically different costs as a function of time variable(s) and features of said cases.

It will be understood that certain features and subcombinations are of utility and may be employed without reference to other features and subcombinations and are contemplated within the scope of the claims. Not all steps listed in the various figures need be carried out in the specific order described. Accordingly, the scope of the invention is intended to be limited only by the following claims.

What is claimed is:

1. A system using automated timers across multiple client-server systems for measurement of production activities, the system comprising:
   at least one processor;
   at least one computer-readable medium having embodied thereon computer-usable instructions which, when executed by the at least on processor, implement a method comprising:
   loading, via a massively-parallel database storing patient information in electronic health records (EHR) in real time, a plurality of Response Time Measurement System (RTMS) timers from a plurality of client systems, wherein a Response Time Measurement System (RTMS) is configured to analyze the plurality of RTMS timers across the plurality of client systems during a given time using the massively-parallel database,
   wherein the plurality of client systems utilize the response time measurement system (RTMS) operating on at least one server, wherein the at least one server comprises the RTMS timers that measure multiple functions that are defined for a plurality of applications in a suite of applications;
   generating response time data associated with activities performed online by a plurality of users accessing the plurality of applications in the suite of applications via the plurality of client systems based on an amount of time for a focus of an application to return to a user;
   measuring, across the plurality of client systems in real time via the RTMS timers, an amount of time each user waits for an application focus to be returned to the user for each online activity performed by the user, wherein the response time data accrue as a byproduct of the performance of the activities, and wherein the response time data provides an indication of an amount of time spent performing activities associated with a process;
   storing, in the massively-parallel database, the amount of time each user has to wait for the application focus to be returned to the user for each online activity performed by the user;
   updating a time-feature-driven activity-based model based on the stored amount of time each user has to wait for the application focus to be returned to the user and the online activity performed by the user;
   identifying a resulting time-feature-driven activity-based model from among a plurality of models, wherein the resulting time-feature-driven activity-based model comprises a complexity to accurately account for observed data; and
   displaying on a user interface the resulting time-feature-driven activity-based model from among the plurality of models that is cast in machine-readable format and rendered via a computer system for review by a human user, wherein an order is performed based on an input by the human user on the user interface.

2. A method using automated timers across multiple client-server systems for measurement of production activities, the method comprising:
   loading, via a massively-parallel database storing patient information in electronic health records (EHR) in real time, a plurality of Response Time Measurement System (RTMS) timers from a plurality of client systems, wherein a Response Time Measurement System (RTMS) is configured to analyze the plurality of RTMS timers across the plurality of client systems during a given time using the massively-parallel database,
   wherein the plurality of client systems utilize the response time measurement system (RTMS) operating on at least one server, wherein the at least one server comprises the RTMS timers that measure multiple functions that are defined for a plurality of applications in a suite of applications;
   generating response time data associated with activities performed online by a plurality of users accessing the plurality of applications in the suite of applications via the plurality of client systems based on an amount of time for a focus of an application to return to a user;
   measuring, across the plurality of client systems in real time via the RTMS timers, an amount of time each user waits for an application focus to be returned to the user for each online activity performed by the user, wherein the response time data accrue as a byproduct of the performance of the activities, and wherein the response time data provides an indication of an amount of time spent performing activities associated with a process;
   storing, in the massively-parallel database, the amount of time each user has to wait for the application focus to be returned to the user for each online activity performed by the user;
   updating a time-feature-driven activity-based model based on the stored amount of time each user has to wait for the application focus to be returned to the user and the online activity performed by the user;

identifying a resulting time-feature-driven activity-based model from among a plurality of models, wherein the resulting time-feature-driven activity-based model comprises a complexity to accurately account for observed data; and displaying on a user interface the resulting time-feature-driven activity-based model from among the plurality of models that is cast in machine-readable format and rendered via a computer system for review by a human user, wherein an order is performed based on an input by the human user on the user interface.

3. A non-transitory computer readable medium having embodied thereon computer-usable instructions which, when executed by the at least on processor, implement a method comprising:

loading, via a massively-parallel database storing patient information in electronic health records (EHR) in real time, a plurality of Response Time Measurement System (RTMS) timers from a plurality of client systems, wherein a Response Time Measurement System (RTMS) is configured to analyze the plurality of RTMS timers across the plurality of client systems during a given time using the massively-parallel database, wherein the plurality of client systems utilize the response time measurement system (RTMS) operating on at least one server, wherein the at least one server comprises the RTMS timers that measure multiple functions that are defined for a plurality of applications in a suite of applications;

generating response time data associated with activities performed online by a plurality of users accessing the plurality of applications in the suite of applications via the plurality of client systems based on an amount of time for a focus of an application to return to a user;

measuring, across the plurality of client systems in real time via the RTMS timers, an amount of time each user waits for an application focus to be returned to the user for each online activity performed by the user, wherein the response time data accrue as a byproduct of the performance of the activities, and wherein the response time data provides an indication of an amount of time spent performing activities associated with a process;

storing, in the massively-parallel database, the amount of time each user has to wait for the application focus to be returned to the user for each online activity performed by the user;

updating a time-feature-driven activity-based model based on the stored amount of time each user has to wait for the application focus to be returned to the user and the online activity performed by the user;

identifying a resulting time-feature-driven activity-based model from among a plurality of models, wherein the resulting time-feature-driven activity-based model comprises a complexity to accurately account for observed data; and displaying on a user interface the resulting time-feature-driven activity-based model from among the plurality of models that is cast in machine-readable format and rendered via a computer system for review by a human user, wherein an order is performed based on an input by the human user on the user interface.

4. The system according to claim 1, wherein the massively-parallel database is configured to load the plurality of Response Time Measurement System (RTMS) timers per period of time across a plurality of client-server systems.

5. The system according to claim 1, wherein the online activity comprises at least one of a unit-level activity, a batch level activity, a product sustaining activity, and a facility level activity.

6. The method according to claim 2, wherein the massively-parallel database is configured to load the plurality of Response Time Measurement System (RTMS) timers per period of time across a plurality of client-server systems.

7. The method according to claim 2, wherein the online activity comprises at least one of a unit-level activity, a batch level activity, a product sustaining activity, and a facility level activity.

8. The non-transitory computer readable medium according to claim 3, wherein the massively-parallel database is configured to load the plurality of Response Time Measurement System (RTMS) timers per period of time across a plurality of client-server systems.

9. The non-transitory computer readable medium according to claim 3, wherein the online activity comprises at least one of a unit-level activity, a batch level activity, a product sustaining activity, and a facility level activity.

10. The system according to claim 1, wherein the amount of time for the focus of an application to return to the user includes a roundtrip transaction time for an activity to be performed.

11. The method according to claim 2, wherein the amount of time for the focus of an application to return to the user includes a roundtrip transaction time for an activity to be performed.

12. The non-transitory computer readable medium according to claim 3, wherein the amount of time for the focus of an application to return to the user includes a roundtrip transaction time for an activity to be performed.

13. The system according to claim 1, further comprising preparing cost data for the model by transforming raw cost data, wherein the raw cost data is transformed by one of de-meaning, scaling or normalizing, or de-skewing statistical distributions of variables.

14. The method according to claim 2, further comprising preparing cost data for the model by transforming raw cost data, wherein the raw cost data is transformed by one of de-meaning, scaling or normalizing, or de-skewing statistical distributions of variables.

15. The non-transitory computer readable medium according to claim 3, the method further comprising preparing cost data for the model by transforming raw cost data, wherein the raw cost data is transformed by one of de-meaning, scaling or normalizing, or de-skewing statistical distributions of variables.

\* \* \* \* \*